(12) United States Patent
Limmer et al.

(10) Patent No.: US 9,554,430 B2
(45) Date of Patent: Jan. 24, 2017

(54) LIGHTING SYSTEM WITH AN INTERFACE HAVING A POWER SUPPLY UNIT AND AT LEAST ONE LIGHT SOURCE MODULE

(71) Applicant: OSRAM GmbH, Munich (DE)

(72) Inventors: Walter Limmer, Munich (DE); Francesco Angelin, Mogliano Veneto (IT); Paolo De Anna, Riese Pio X (IT); Bernd Rudolph, Forstern (DE)

(73) Assignee: OSRAM GMBH, Munich (DE)

( * ) Notice: Subject to any disclaimer, the term of this patent is extended or adjusted under 35 U.S.C. 154(b) by 186 days.

(21) Appl. No.: 14/410,581

(22) PCT Filed: Jun. 25, 2013

(86) PCT No.: PCT/EP2013/063293
§ 371 (c)(1),
(2) Date: Dec. 23, 2014

(87) PCT Pub. No.: WO2014/001342
PCT Pub. Date: Jan. 3, 2014

(65) Prior Publication Data
US 2015/0145437 A1    May 28, 2015

(30) Foreign Application Priority Data

Jun. 25, 2012  (IT) .................................. 2012A0558
Dec. 21, 2012  (DE) ........................ 10 2012 224 348

(51) Int. Cl.
*H05B 33/08*  (2006.01)

(52) U.S. Cl.
CPC ........ *H05B 33/0815* (2013.01); *H05B 33/089* (2013.01); *H05B 33/0809* (2013.01);
(Continued)

(58) Field of Classification Search
CPC ............ H05B 33/0821; H05B 33/0848; H05B 33/0854
See application file for complete search history.

(56) References Cited

U.S. PATENT DOCUMENTS 7,408,305 B2   8/2008  Ploetz et al.
7,871,187 B2   1/2011  Flandre et al.
(Continued)

FOREIGN PATENT DOCUMENTS

DE      10051528 A1    5/2002
DE      10303454 A1    8/2004
(Continued)

OTHER PUBLICATIONS

Search Report issued in the German application No. 10 2012 223 348.8 on Mar. 21, 2013.
(Continued)

*Primary Examiner* — Douglas W Owens
*Assistant Examiner* — Pedro C Fernandez
(74) *Attorney, Agent, or Firm* — Viering, Jentschura & Partner MBB

(57) ABSTRACT

Various embodiments may relate to a power supply unit, including an output for outputting an operating current depending on an internal measurement signal, a communications line, and a current-measuring device, which is connected to the communications line. The current-measuring device is designed to generate a current on the communications line which is proportional to the conductance of a current-setting resistance. The current-measuring device has a current mirror, which is designed to mirror the generated current on the communications line. The current-measuring device is designed to convert the mirrored current into an internal measurement signal with a reference potential which is different than the communications line. At least one (Continued)

Figure 1:
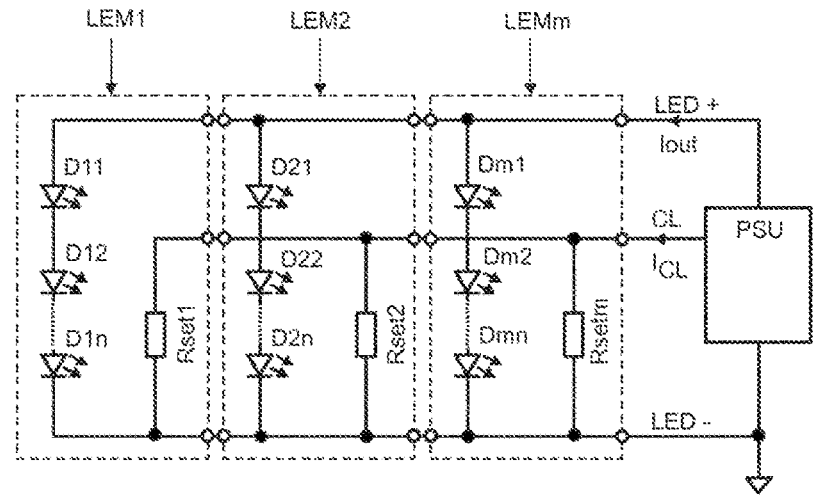

light source module is connectable to the output, wherein the at least one light source module has the current-setting resistance, which is connectable to the communications line.

15 Claims, 17 Drawing Sheets

(52) U.S. Cl.
CPC ..... *H05B 33/0821* (2013.01); *H05B 33/0845* (2013.01); *H05B 33/0848* (2013.01); *H05B 33/0854* (2013.01)

(56) References Cited

U.S. PATENT DOCUMENTS

| | | | |
|---|---|---|---|
| 2002/0140378 A1 | 10/2002 | Volk et al. | |
| 2004/0090189 A1* | 5/2004 | Yoneda | H05B 33/0848 315/291 |
| 2004/0195983 A1* | 10/2004 | Toyota | H05B 33/0812 315/312 |
| 2008/0224634 A1 | 9/2008 | Scilia | |
| 2009/0033243 A1 | 2/2009 | Gater | |
| 2010/0220049 A1* | 9/2010 | Murakami | H05B 33/0815 345/102 |
| 2010/0244790 A1 | 9/2010 | La Rosa et al. | |
| 2011/0068701 A1 | 3/2011 | Van De Ven et al. | |
| 2011/0210675 A1* | 9/2011 | Hamamoto | F21S 8/031 315/185 R |
| 2011/0260648 A1 | 10/2011 | Hamamoto et al. | |
| 2011/0279058 A1 | 11/2011 | Dari et al. | |
| 2012/0119677 A1 | 5/2012 | Serdarevic et al. | |
| 2012/0235598 A1 | 9/2012 | Branchetti et al. | |
| 2012/0256548 A1 | 10/2012 | Collins et al. | |

FOREIGN PATENT DOCUMENTS

| | | |
|---|---|---|
| DE | 102011087658 A1 | 6/2013 |
| EP | 1349433 A2 | 10/2003 |
| EP | 1411750 B1 | 4/2004 |
| EP | 1517588 A1 | 3/2005 |
| EP | 1874097 A1 | 1/2008 |
| WO | 2006126172 A2 | 11/2006 |
| WO | 2010091619 A1 | 8/2010 |
| WO | 2013079251 A1 | 6/2013 |

OTHER PUBLICATIONS

International Search Report issued in PCT/EP2013/063293 on Aug. 29, 2013.

U.S. Office Action based on U.S. Appl. No. 14/409,479 (25 pages) dated Sep. 9, 2016.

* cited by examiner

LIGHTING SYSTEM WITH AN INTERFACE HAVING A POWER SUPPLY UNIT AND AT LEAST ONE LIGHT SOURCE MODULE

RELATED APPLICATIONS

The present application is a national stage entry according to 35 U.S.C. §371 of PCT application No.: PCT/EP2013/063293 filed on Jun. 25, 2013, which claims priority from Italian application No.: TO2012A000558 filed on Jun. 25, 2012, and German application No.: 10 2012 224 348.8 filed on Dec. 21, 2012, and is incorporated herein by reference in its entirety.

TECHNICAL FIELD

Various embodiments relate to the field of solid state lighting, i.e. to general lighting primarily or exclusively by LEDs, and describes a lighting system with an interface between a light source module and the power supply unit supplying said light source module, the light source module and the associated power supply unit. Various embodiments generally relate to a power supply unit for supplying power to a light source module or a plurality of light source modules, in particular those with light-emitting diodes (LEDs) as light sources, and to a lighting system including a power supply unit and at least one light source module. Specifically, various inventive methods and circuits disclosed here relate to a self-setting power supply unit for supplying power to a light source module or a plurality of light source modules having light-emitting diodes (LEDs) as light sources, and to an LED-based lighting system including a self-setting power supply unit and at least one light source module.

BACKGROUND

Lighting components which are based on semiconductor light sources such as, for example, LEDs provide a serious alternative to traditional fluorescent lamps, high-pressure discharge lamps or incandescent lamps. In principle, LEDs not only have a high conversion efficiency, a high optical efficiency, a long expected life and low operating costs, but also many other advantages. In some applications, an LED-based lighting system may include a power supply unit which provides an LED operating current for a plurality of light source modules, each in turn containing one or more LEDs. For example, a light source module can have a circuit board, for example a printed circuit or a printed circuit board (PCB), on which the one or more LEDs are mounted. Such circuit boards can be pushed into rails of a luminaire or plugged into female connectors on a main circuit board on which the power supply unit can be located.

In various applications or installations of an LED-based lighting system, the number of LEDs or light source modules required will be different in each case. For example, the number of LEDs or light source modules is to be matched to the required light emission of a specific installation. In general, the value of the LED operating current which is provided by a power supply unit is to be matched to the number of LEDs or light source modules to be supplied power by this power supply unit. If a single power supply unit is intended to be used in a multiplicity of LED-based lighting systems with different numbers of LEDs or light source modules, the power supply unit must contain an apparatus for setting the setpoint value of the LED operating current, which apparatus matches the operating current requirement to the different light source modules corresponding to the different number of light sources contained therein. At present, the number of LEDs and light source modules which are intended to be contained in a specific LED-based lighting system is fixed at the time of manufacture of this LED lighting system. If the same power supply unit is intended to be used in different LED lighting systems with a different number of light source modules, the power supply unit needs to be programmed for the intended LED lighting system at the time of manufacture, with the result that the LED operating current provided is appropriate for the specific number of light source modules which are contained in the intended LED lighting system.

As soon as a light source module with a relatively short life needs to be replaced during the relatively long life of an LED- based lighting system, the actual problem on which this invention is based arises: the advancement on the component part level of the LED is so serious at present that a light source module of the same type will emit much more light or will require substantially less current for the same emitted light if it is, for example, three years younger than the comparison module. Therefore, not only the specification present at the time of manufacture of the lighting system, but also the time per se play a significant role in this.

This problem has been addressed by setting up data interchange between the power supply unit and the light source module. Data interchange in this case means that the light source module transmits some information to the power supply unit, relating to the current requirement of the module for fulfilling its optical specification or its working temperature for the purpose of reducing the value of the current provided when a certain temperature limit value is exceeded. Various approaches are known for the interchange of this information between the light source module and the power supply unit. Buses can be used for data interchange. Known in this case are, for example, analog buses such as the 1 . . . 10 V interface or digital buses such as DALI (digital addressable lighting interface). Likewise known technologies are simple resistance networks, which can be measured by the power supply unit and transmit the current requirement of the light source module just connected or the light source modules just connected to said power supply unit. DE 100 51 528 A1 discloses an interface in which a special resistance, a so-called current-setting resistance, is connected between a third line and the negative supply line. If a plurality of light source modules are connected to a single power supply unit, the resistances are connected in series or parallel with one another, and in this way a summation signal is passed back to the power supply unit in order to define the total current requirement. The German patent application 102011087658.8 likewise discloses resistances for defining the current requirement of each individual light source module, i.e. module-specific current-setting resistances.

The bus solutions have the disadvantage of two additional connecting lines being required. The resistance solutions only require one additional connecting line, but the evaluation of the resistance network and the setting of the current value resulting from this can become very complicated.

Since complete lighting systems including a power supply unit and light source module(s) have appeared on the market, various companies have attempted to adopt a common approach for putting into operation the communication between the two component parts of the above systems; likewise, some digital protocols are in use for the more complicated high-end systems, but the latter technology is not the background of the present disclosure and needs to be discussed separately.

The company Osram, for example, has already proposed an interface which is also capable of providing an auxiliary power to an active circuit for thermal derating on a light source module. In this interface type, a current-setting resistance on the light source module in conjunction with a pullup resistance in the power supply unit forms a voltage divider, with the purpose of forming a center-point voltage which defines the output current of the power supply unit. An operational amplifier on the light source module begins to limit this center-point voltage and therefore the operating current provided as soon as the module overheats. The company Philips has proposed another interface in which one signal line is connected to the current-setting resistance and another signal line is connected to a temperature-sensitive resistance, and in which the thermal derating is performed by the power supply unit itself without any active component on a light source module being required.

Both of the last-mentioned interfaces require a third extra line for the common signal ground feedback and use a voltage generated by the current-setting resistance on the light source module for setting the setpoint operating current value in such a way that the operating current is set to be higher the higher the voltage across the current-setting resistance or across the current-setting resistances is.

Recently, the company Osram has proposed a slightly modified interface which is based on the 1 . . . 10 V bus mentioned already above, but modified by a precision current source in the power supply unit which makes it possible to achieve precise setpoint operating current value setting with only a single current-setting resistance per light source module. A further modification of this interface in turn consists in replacing the current-setting resistances on the light source modules with Zener diodes.

At present, a new demand is emerging on the market: the possibility of connecting various modules in parallel with one another and supplying power to said modules jointly by one and the same power supply unit. The operating current provided by this power supply unit in this case needs to correspond to the sum of the nominal current values of all of the light source modules connected thereto at that time, and the capability of thermal derating also needs to be maintained in the case of multi-module arrangements. A thermal derating signal on a data line should finally even be dominant with respect to a summation current setting signal.

Nevertheless, it is necessary to configure the lighting systems to be simpler, which at present results in the reduction in the number of the additional data lines. Bus-based interfaces require at least four lines, two for the light source module operating current and at least two for the bus.

New characteristics for meeting the requirements are envisaged:
  a plurality of modules are intended to be connectable in parallel and capable of being supplied power by one and the same power supply unit using the same interface. In this case, the individual modules are considered to be the same as one another, or at least are considered to be modules which have the same operating voltage as one another.
  the interface for setting the operating current should have a reduced number of lines and should be as simple as possible, for cost reasons, in particular on the side of the light source modules.

All of the interfaces previously proposed and known are not capable of correctly supporting multiple connections of light source modules. The evaluation circuits for the interfaces are also complex in terms of manufacture. A novel interface is proposed which is simpler to manufacture.

SUMMARY

Various embodiments provide a power supply unit and a light source module which has a simple interface for setting the current to be applied to the light source module. Various embodiments further provide a method for setting a current value for at least one light source module which is connected to a power supply unit and requires little complexity for the manufacture of the components involved.

By virtue of a power supply unit having these features, only one additional communications line is required for setting the current since an electrical line is also used between the power supply unit and the light source module. A plurality of light source modules can be connected to the power supply unit without the functionality for correct setting of the current being impaired.

Preferably, the light source modules, connected in parallel, are connected to the power supply unit. This has the advantage that the current-setting resistances are then also connected in parallel, and the resultant conductance of the parallel-connected resistances is proportional to the current requirement of all connected light source modules. The power supply unit has an output for outputting an operating current depending on an internal measurement signal, a communications line, and a current-measuring device, which is connected to the communications line, wherein the current-measuring device is designed to generate a current on the communications line which is proportional to the conductance of a current-setting resistance, the current-measuring device, in accordance with the present disclosure, has a current mirror, which is designed to mirror the generated current on the communications line, the current-measuring device is designed to convert the mirrored current into an internal measurement signal with a reference potential which is different than the communications line, and at least one light source module is connectable to the output, wherein the at least one light source module has the current-setting resistance, which is connectable to the communications line. By virtue of the current mirror in accordance with the present disclosure, the potential deviation necessary for the measurement can be compensated for in a simple and inexpensive manner. The potential deviation is necessary since most power stages for current measurement use a shunt, i.e. a resistor with a low resistance, which is generally connected between the circuit ground and the common grounding line of the LED modules. This results in a potential difference which would otherwise result in considerable measurement errors.

The current mirror is preferably formed by a first transistor and a second transistor, wherein the transistors have first and second emitter negative-feedback resistances. This topology is simple and inexpensive to manufacture and is fully sufficient with respect to measurement accuracy for the task to be managed.

In a preferred embodiment, the control electrodes of the first transistor and of the second transistor are connected to one another, the reference electrode of the first transistor is connected to a supply voltage via the first emitter negative-feedback resistance, the reference electrode of the second transistor is connected to the supply voltage via the second emitter negative-feedback resistance, the working electrode of the first transistor is connected to the communications line, and the working electrode of the second transistor is connected to a measuring resistance. A current mirror with this topology is particularly simple and inexpensive to manufacture.

Particularly preferably, the voltage at the control electrode of the first transistor of the current mirror is set in such a way that the voltage on the communications line corresponds to a predetermined voltage. Therefore, the current mirror is used firstly for shifting the reference potential of the measured current, but at the same time secondly also as voltage source for generating the current to be measured. The function of the voltage source can be produced in a simple and inexpensive manner by a few parts.

In one embodiment, the function of the voltage source is produced by virtue of the fact that the current-measuring device furthermore has a third transistor, whose working electrode is connected to the control electrode of the first transistor, whose reference electrode is connected to the working electrode of the first transistor and whose control electrode is connected to the center point of a series circuit including a resistance and a Zener diode, wherein the series circuit is connected between the supply voltage and an output connection. By virtue of these three component parts, the function can be performed with sufficient accuracy. The three component parts do not require much space on the printed circuit board and are inexpensive.

In another embodiment, the function of the voltage source is produced by virtue of the fact that the control electrode of the third transistor is connected to the center point of a voltage divider, which is connected in parallel with the Zener diode. Therefore, the accuracy can be increased in comparison with the previous embodiment.

In a further embodiment, the function of the voltage source is produced by virtue of the fact that the Zener diode is an adjustable Zener diode, whose control electrode is connected to the center point of a voltage divider, which is connected between the communications line and an output of the power supply unit. This embodiment provides a further increase in the precision of the output voltage.

A further embodiment consists in that the current-measuring device furthermore has a third transistor, whose working electrode is connected to the control electrode of the first transistor via a resistance, whose reference electrode is connected to an internal circuit ground, and whose control electrode is connected to a microcontroller. In this embodiment, the voltage source is controlled by a microcontroller, which is generally provided in the power supply unit in any case for controlling the power section. For this purpose, the voltage on the communications line and the voltage on the common ground are furthermore input into the microcontroller so that said microcontroller can measure the voltage on the communications line in relation to the common ground. Since the microcontroller generally also requires the potential on the common ground for the power section, only one additional analog-to-digital converter is required. The third transistor is in this case actuated by pulse width modulation (PWM) in order to set the voltage on the communications line. By virtue of the digital regulation method, the measurement circuit can also be operated in clocked fashion, i.e., for example, can be switched on for a short measurement period only once per second. As a result, the current consumption of the arrangement can be reduced. In order to perform a measurement, it is sufficient in this case to activate the measurement circuit with the current mirror for a few milliseconds.

A further embodiment consists in that the current-measuring device is designed to generate the supply voltage of the current-measuring device from the output voltage of the power supply unit. This reduces the complexity involved in the manufacture of the power supply unit further since an additional power supply for the current mirror is dispensed with.

A further embodiment consists in that the current-measuring device is designed to filter the supply voltage generated from the output voltage and/or to stabilize it in terms of the voltage. This has the advantage that, during clocked operation of the measurement circuit and at high dimming settings of the connected light modules, no visible artifacts owing to the clocking of the measurement circuit result.

In a preferred embodiment, a plurality of light source modules, connected in parallel, are connectable to the power supply unit.

The light source module has an input and a communications line, for connection to the above-described power supply unit, and a current-setting resistance for setting the current applied to the light source module. As a result, said light source module is capable of communicating its current requirement to the power supply unit via the communications line.

In one embodiment, the light source module furthermore has a thermal derating unit. As a result, it can automatically derate the applied current in the case of an excess temperature situation, with the result that the module is capable of protecting itself.

A lighting system according to the present disclosure has a power supply unit as described above and at least one light source module, likewise described above, which light source module is connected to the power supply unit.

The method according to the present disclosure for setting a current value for at least one light source module connected to a power supply unit is characterized by the following steps:

applying a measurement voltage to a communications line by means of a current mirror, mirroring the current flowing in the communications line, converting the mirrored current into an internal measurement signal with a reference potential which is different than the communications line, evaluating the internal measurement signal, setting an operating current at the output of the power supply unit on the basis of the evaluated measurement signal.

In one embodiment of the method according to the present disclosure, the current flowing in the communications line is proportional to the conductance of a current-setting resistance of the at least one light source module.

Further advantageous developments and configurations of the lighting system according to the present disclosure having the power supply unit according to the present disclosure and the light source module according to the present disclosure are set forth in the description below, in particular in the combination of details from various sections of the description below.

BRIEF DESCRIPTION OF THE DRAWING(S)

Figure 2:
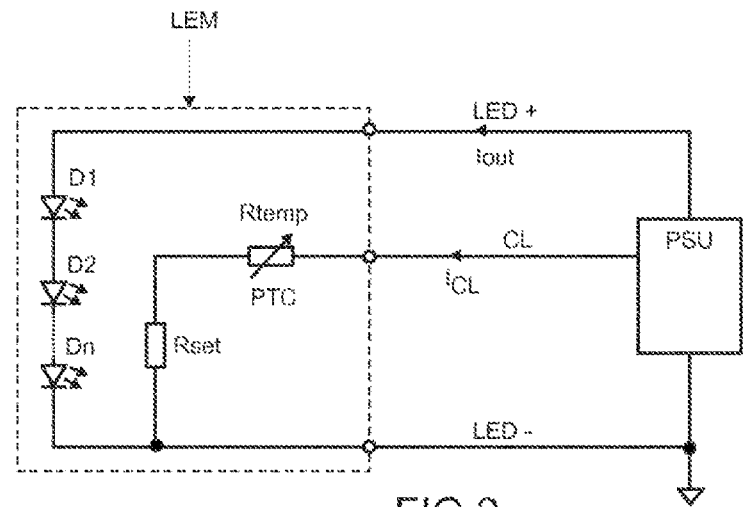
Figure 3:
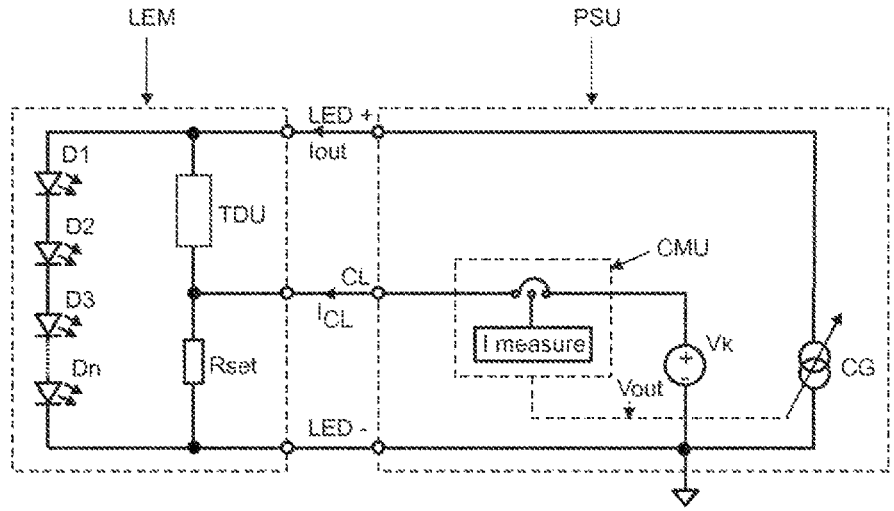
Figure 4A:
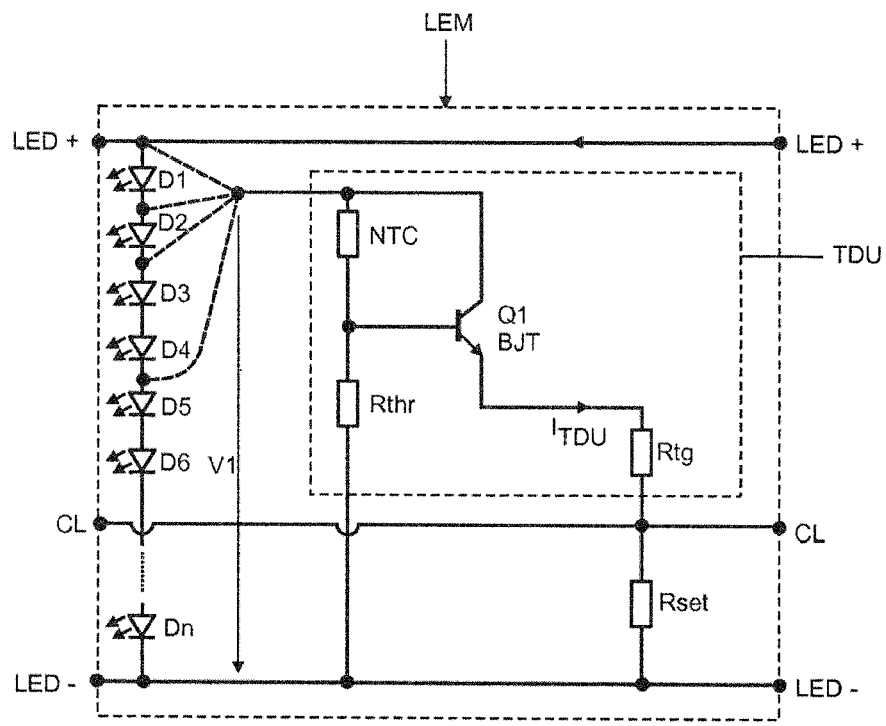
Figure 4B:
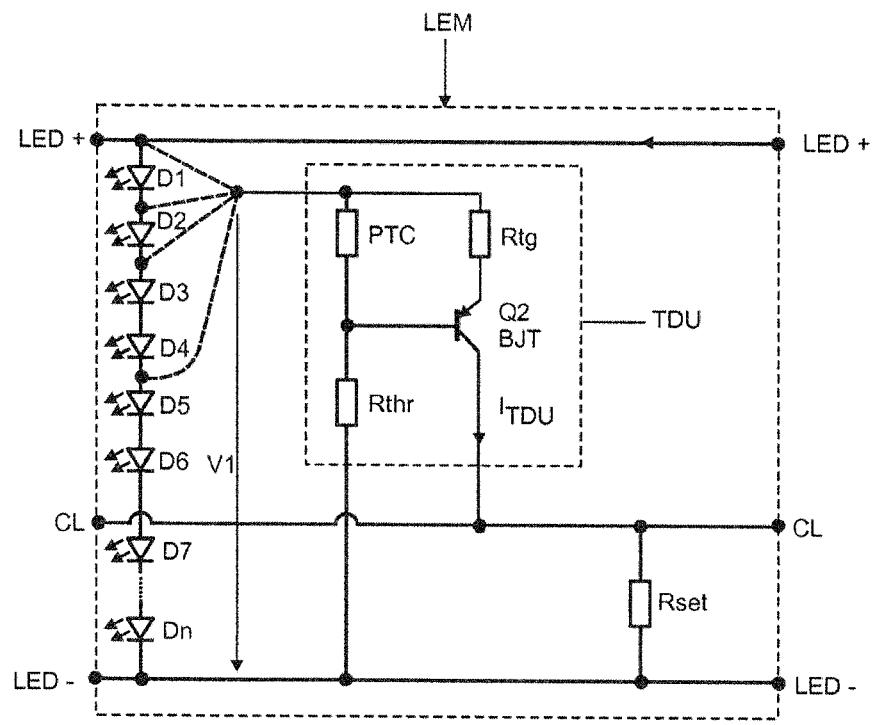
Figure 5:
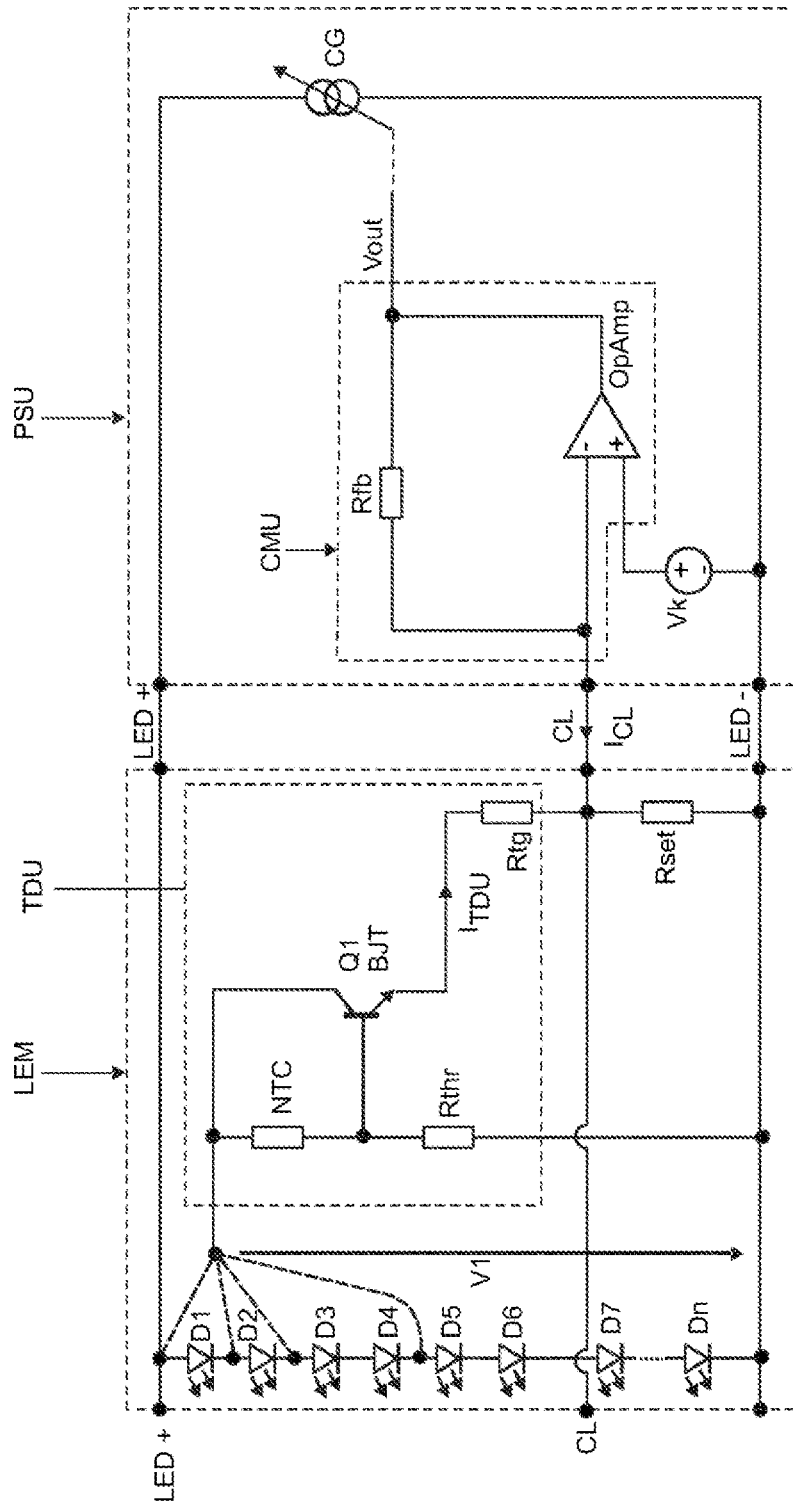
Figure 6:
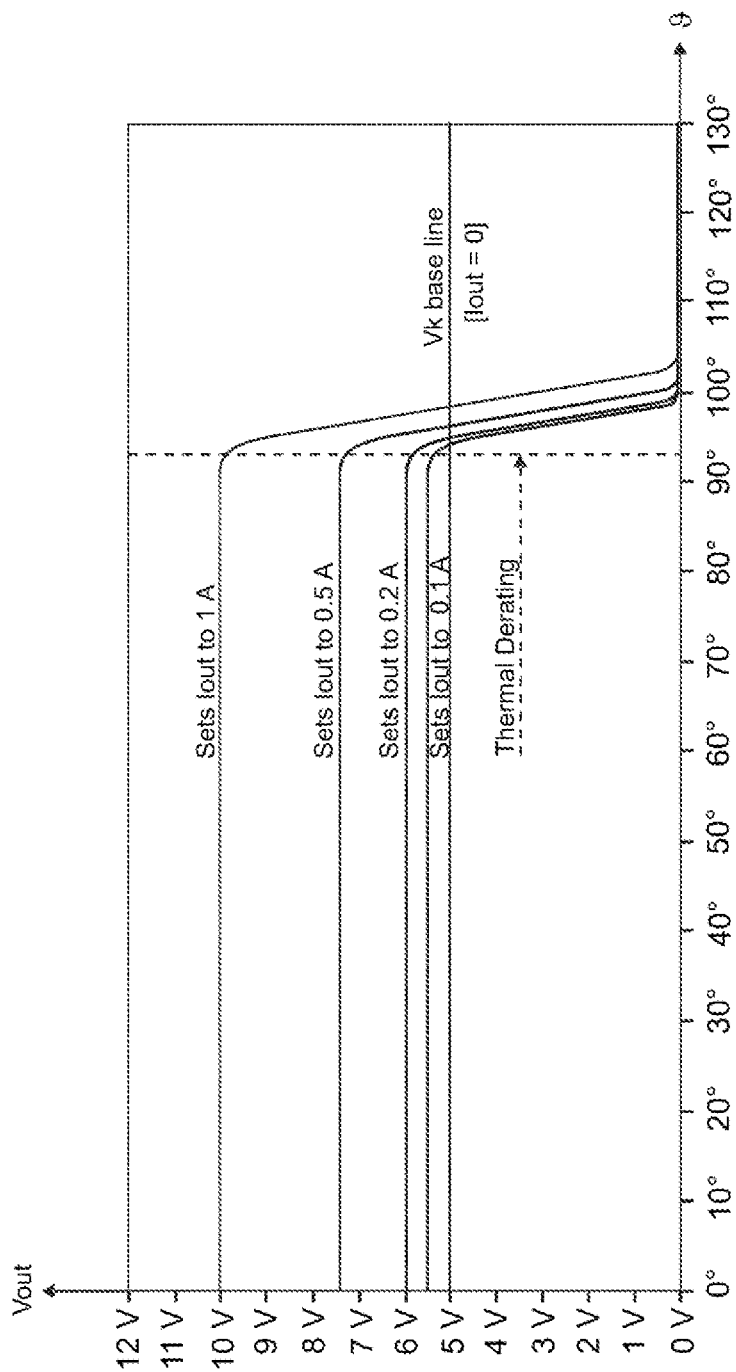
Figure 7:
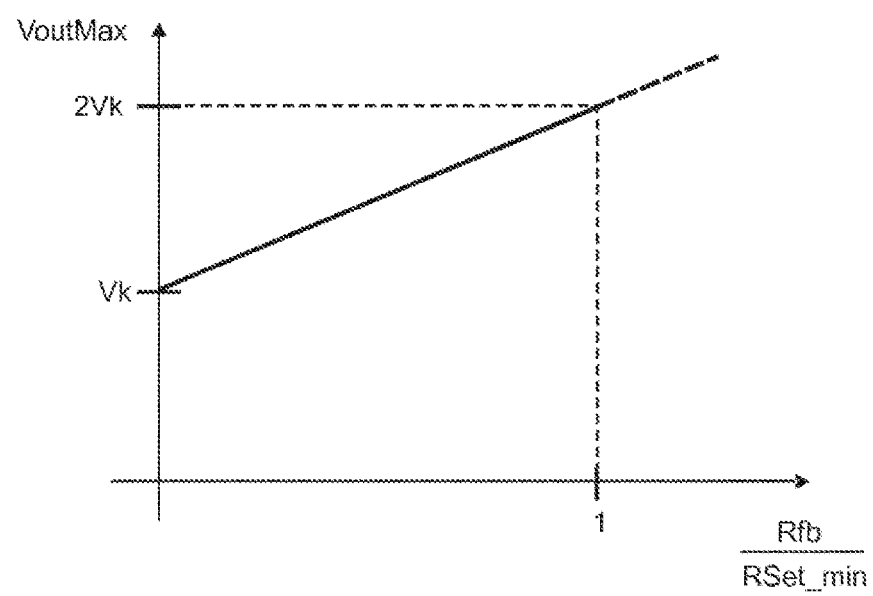
Figure 8:
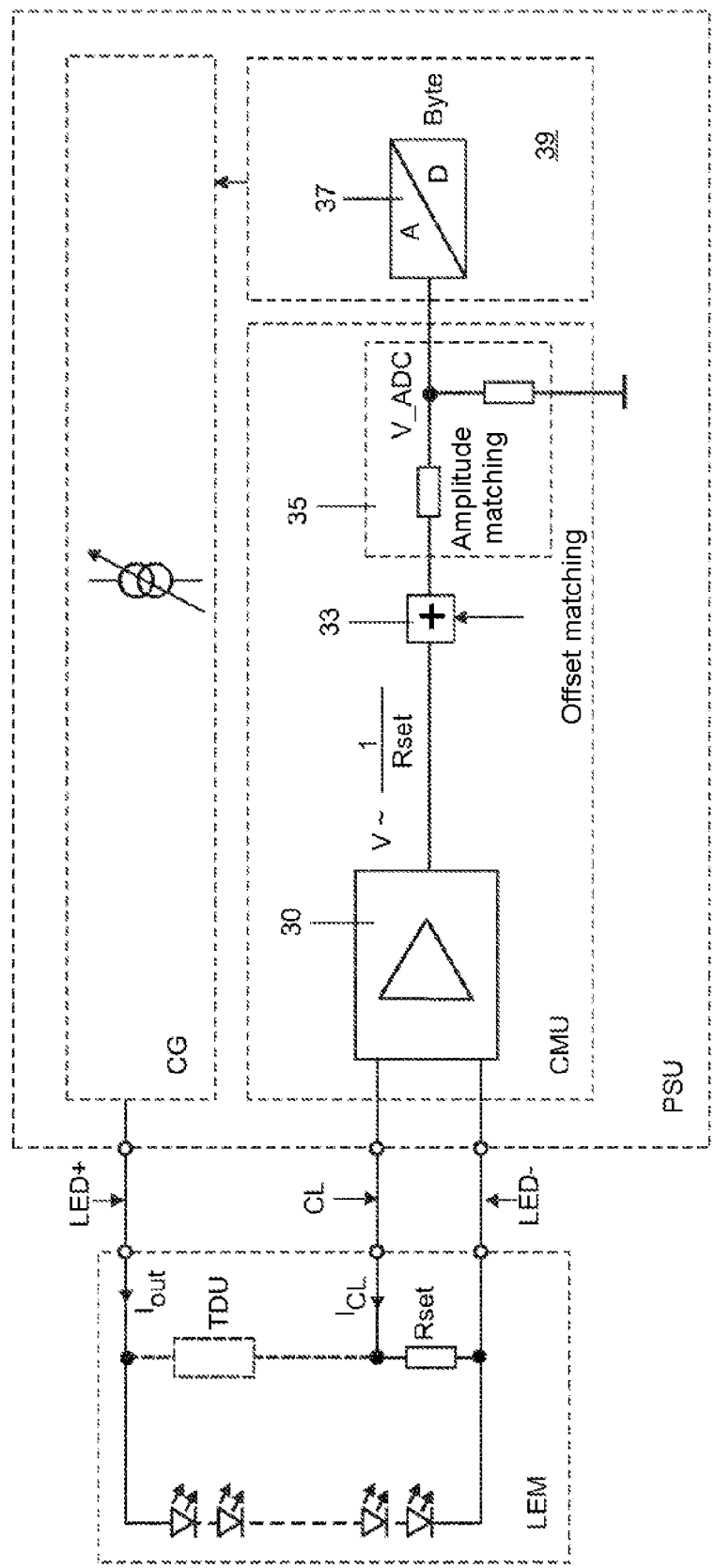
Figure 9:
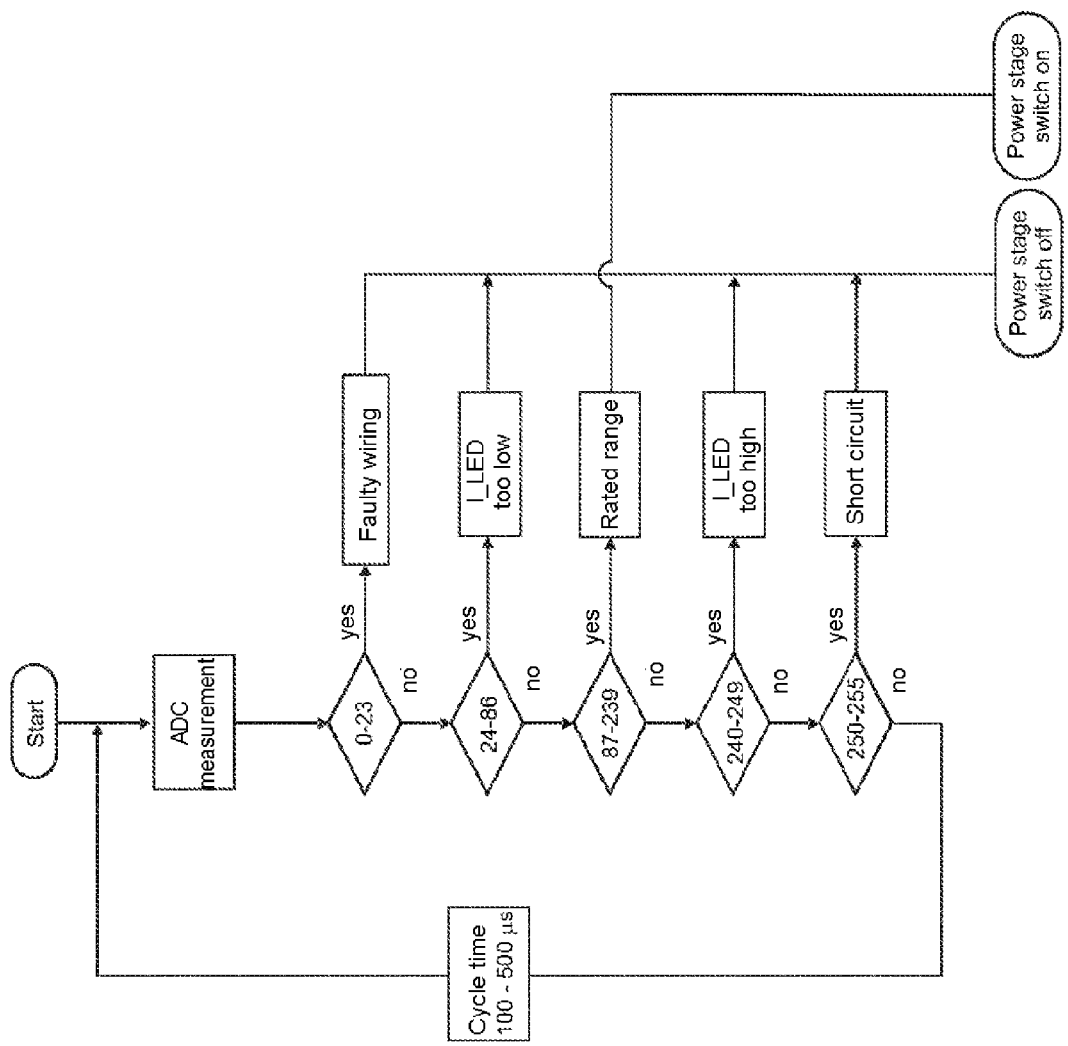
Figure 10:
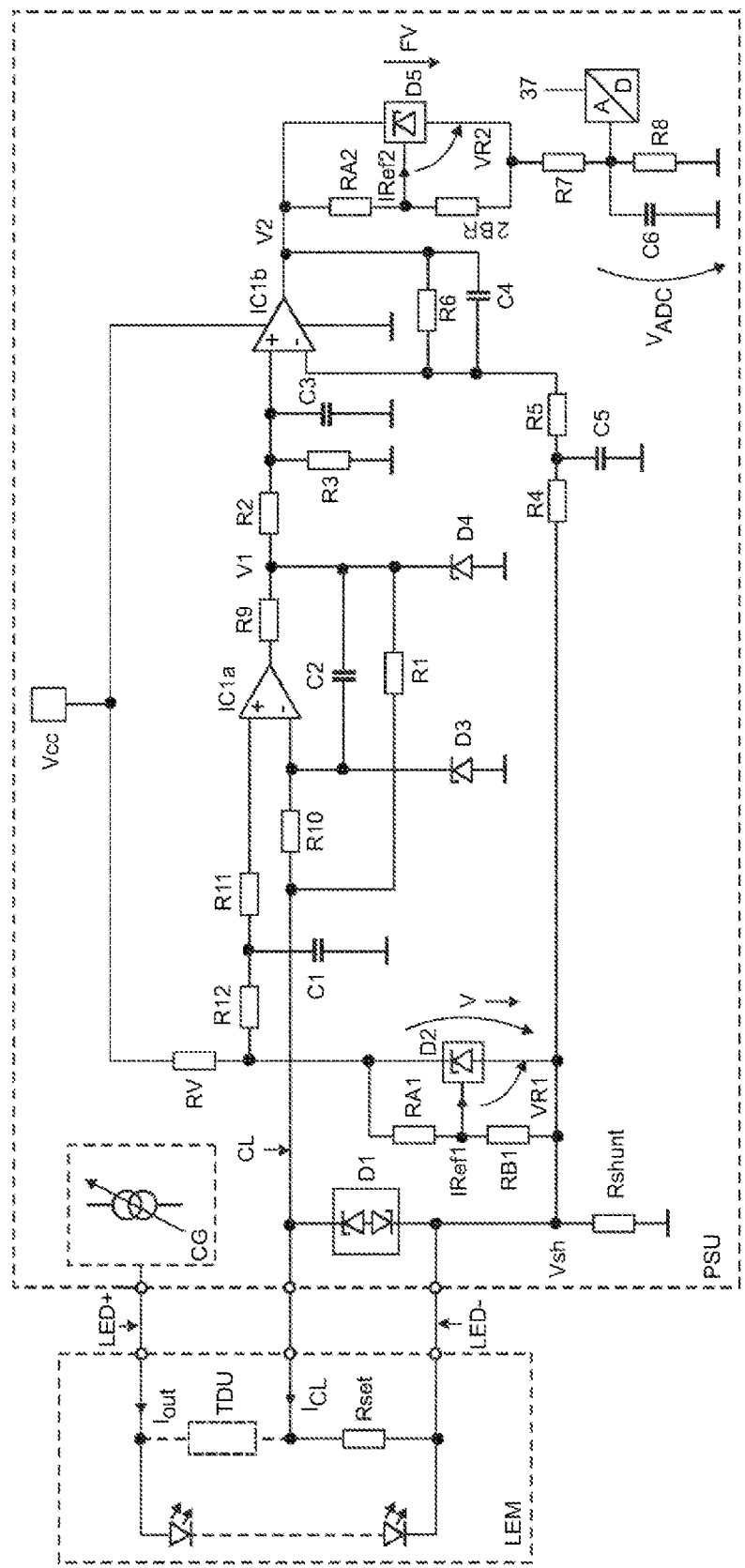
Figure 11:
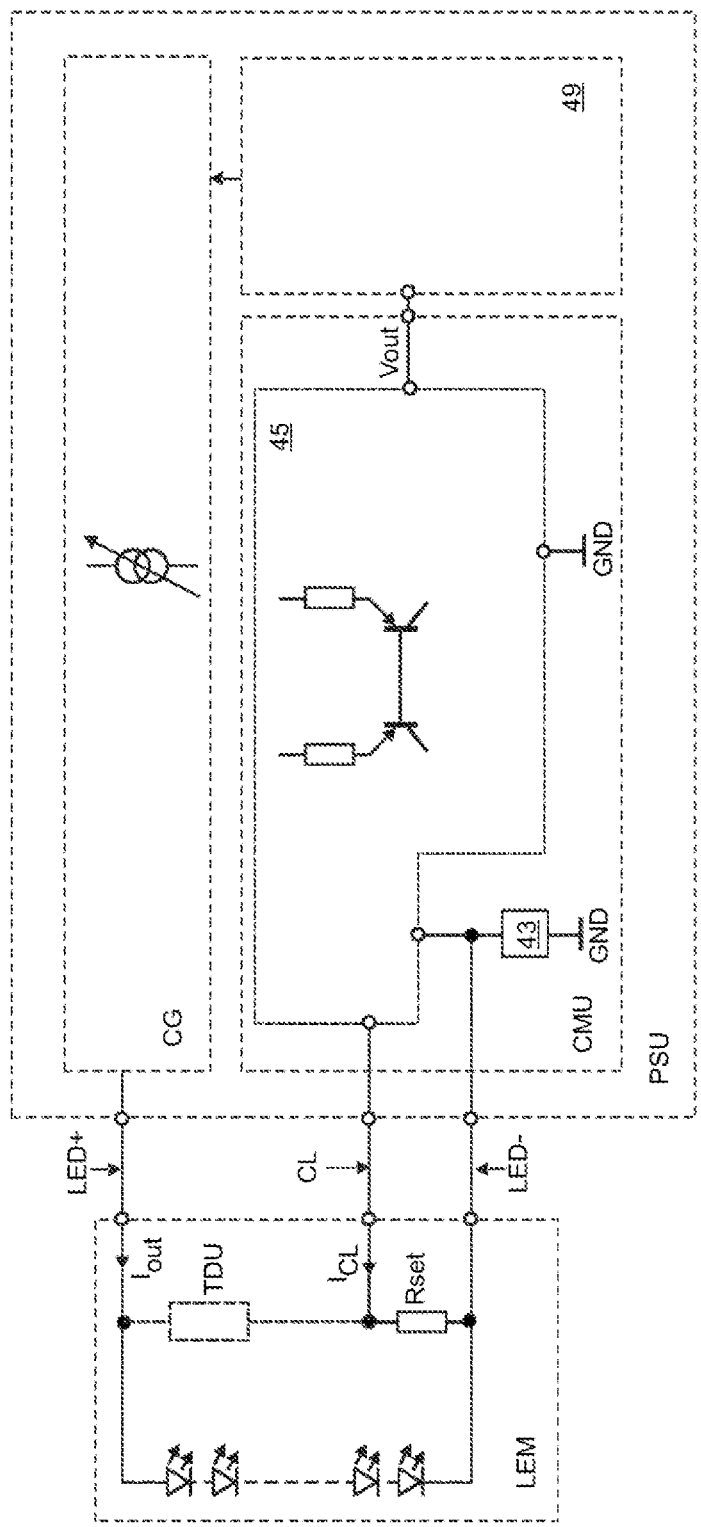
Figure 12:
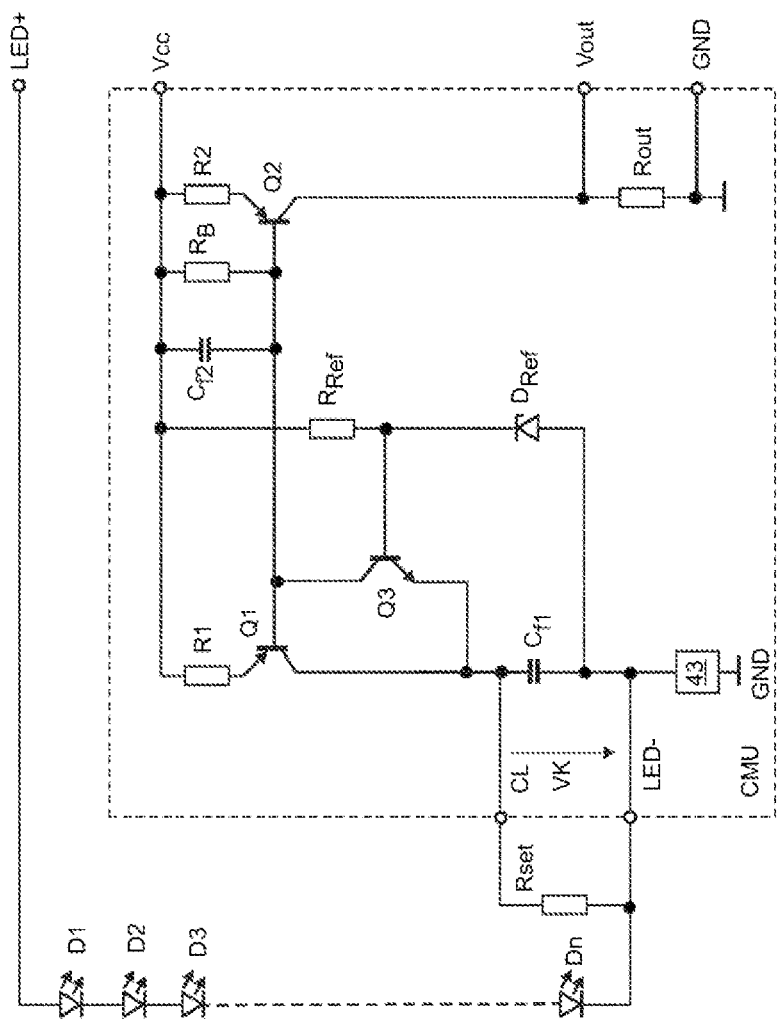
Figure 13:
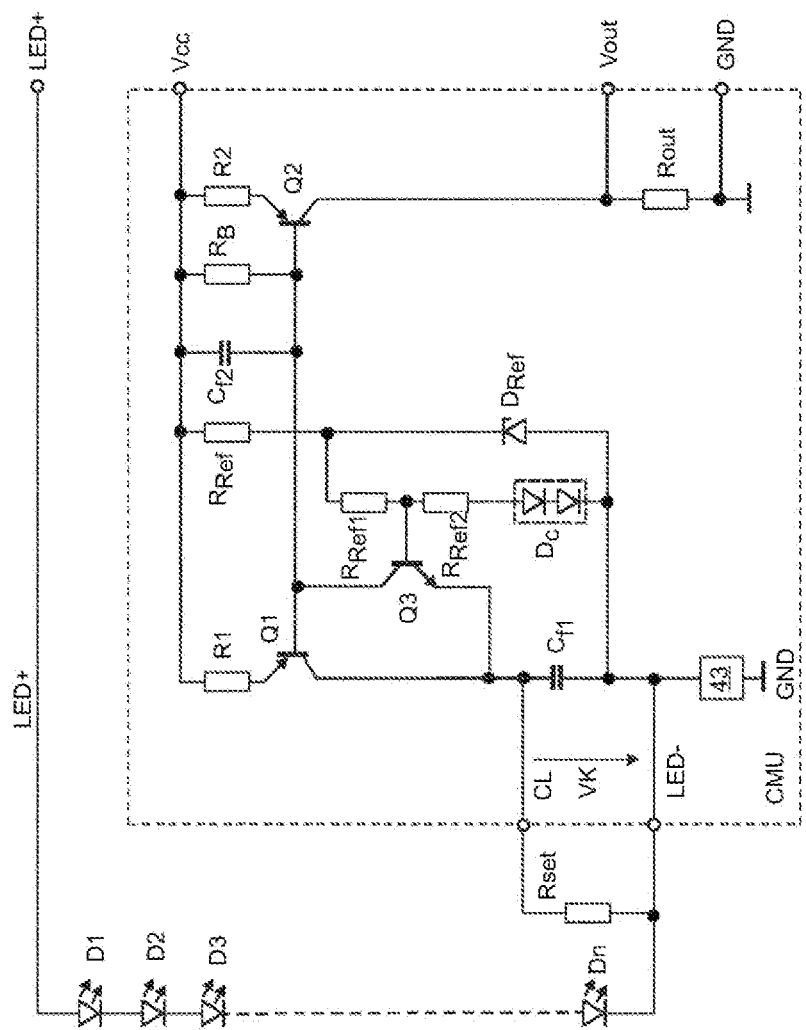
Figure 14:
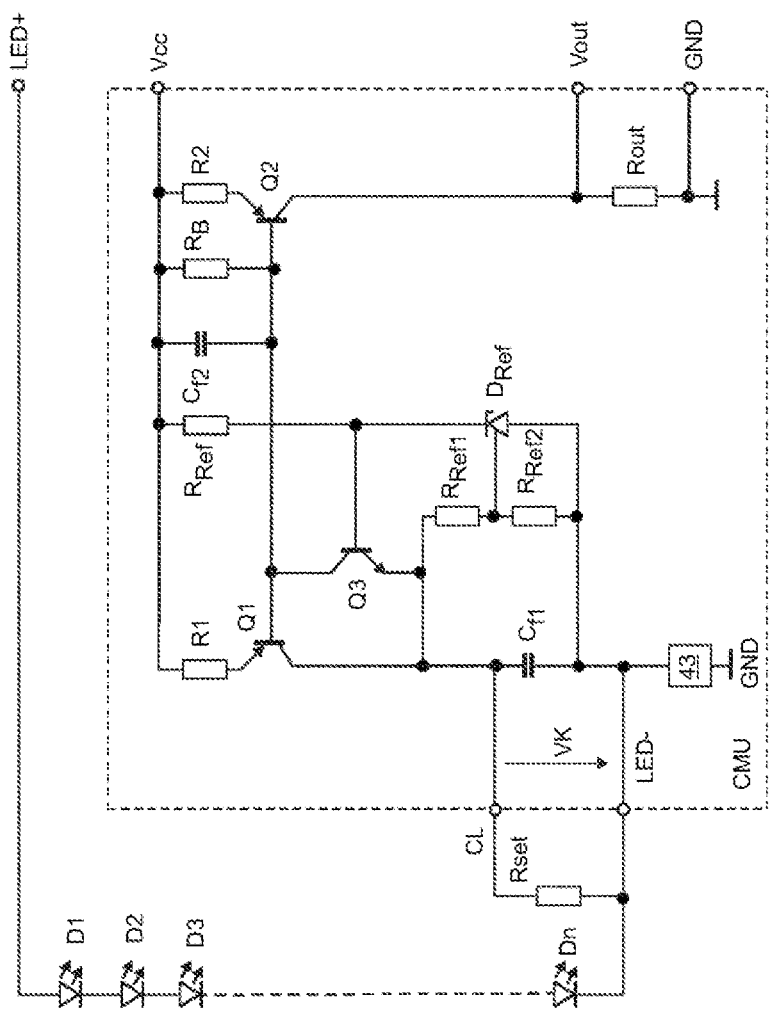
Figure 15A:
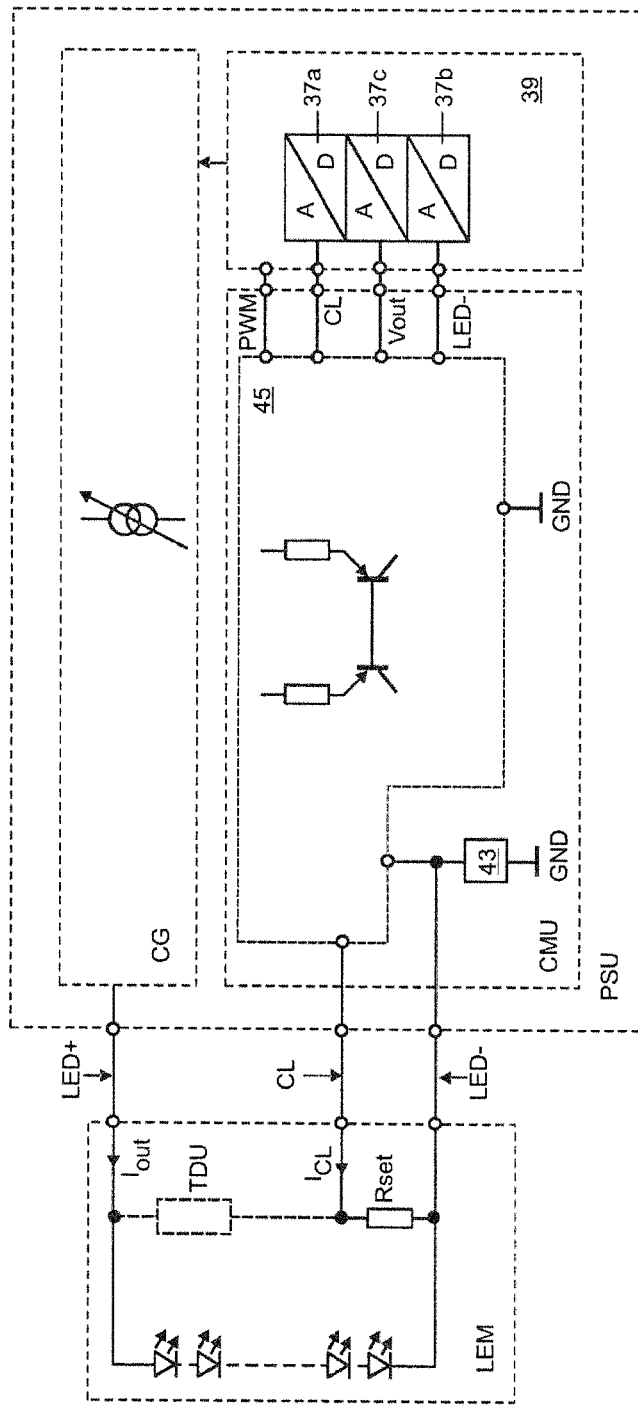
Figure 15B:
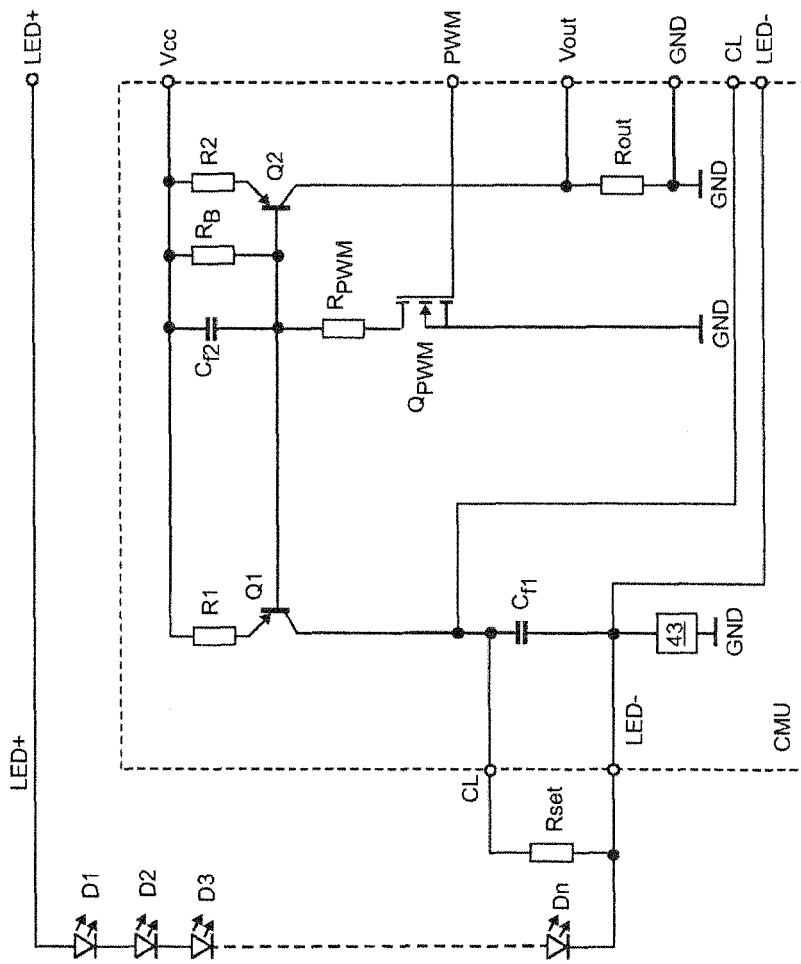
Figure 16:
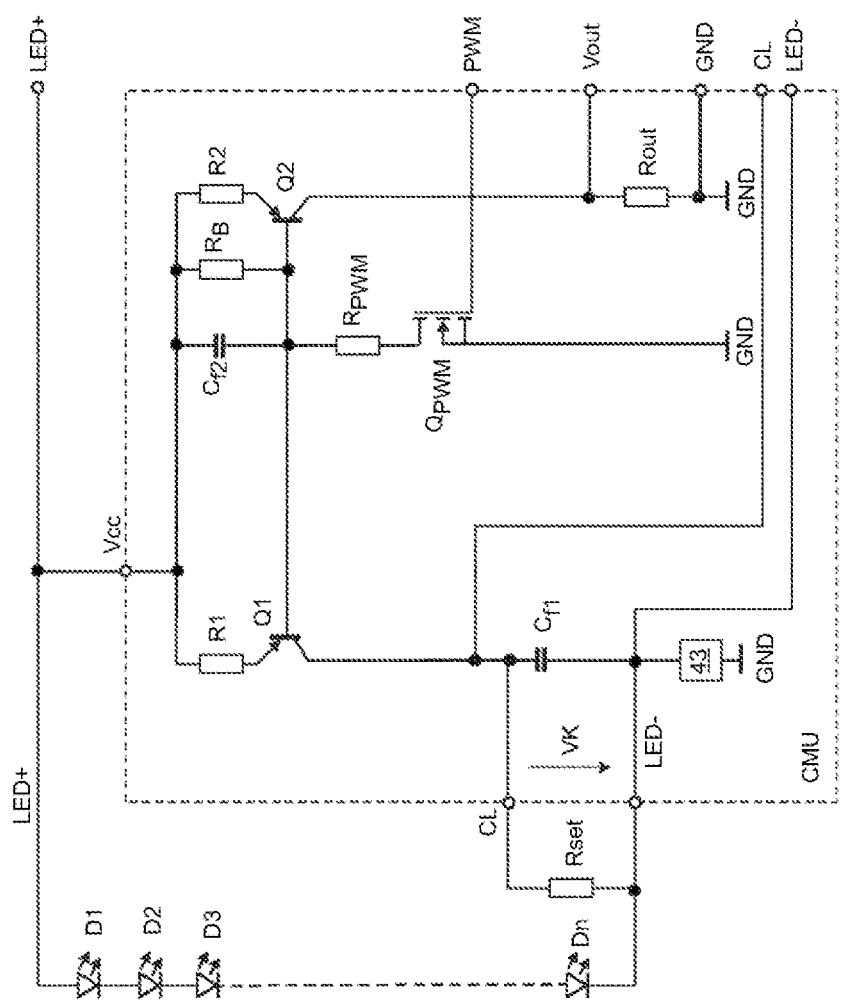
Figure 17:
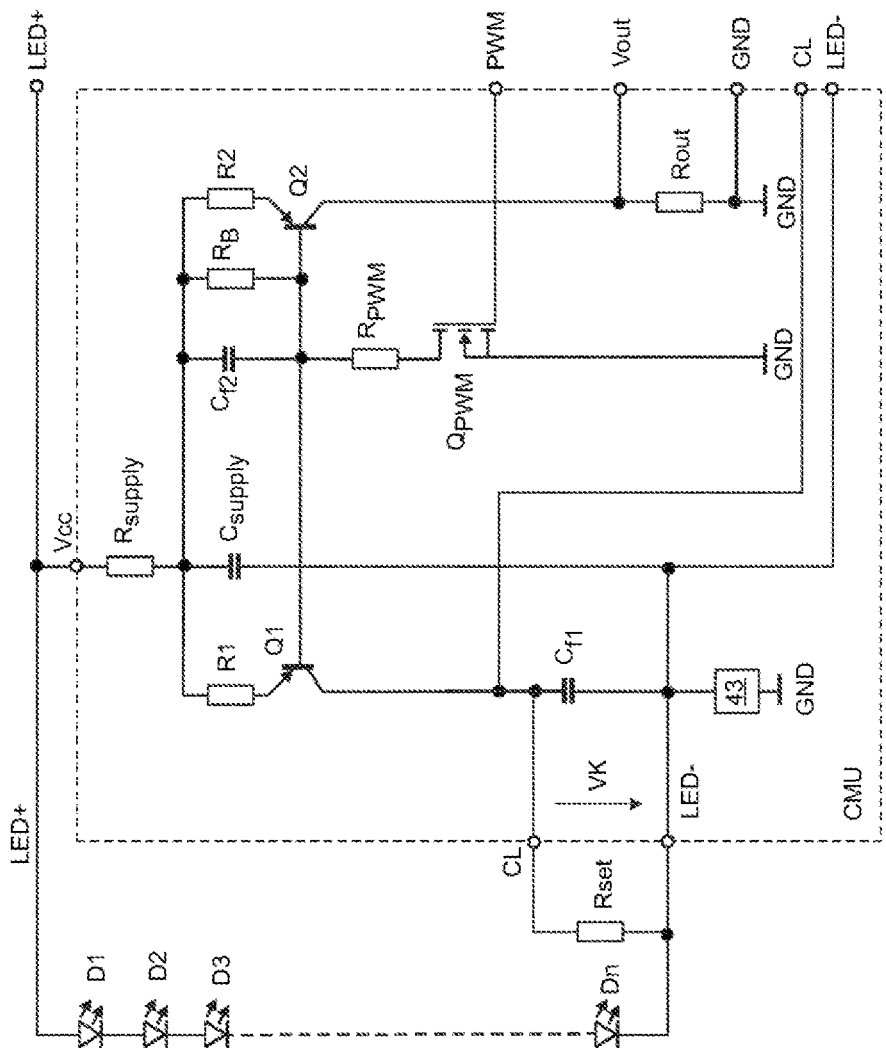
Figure 18:
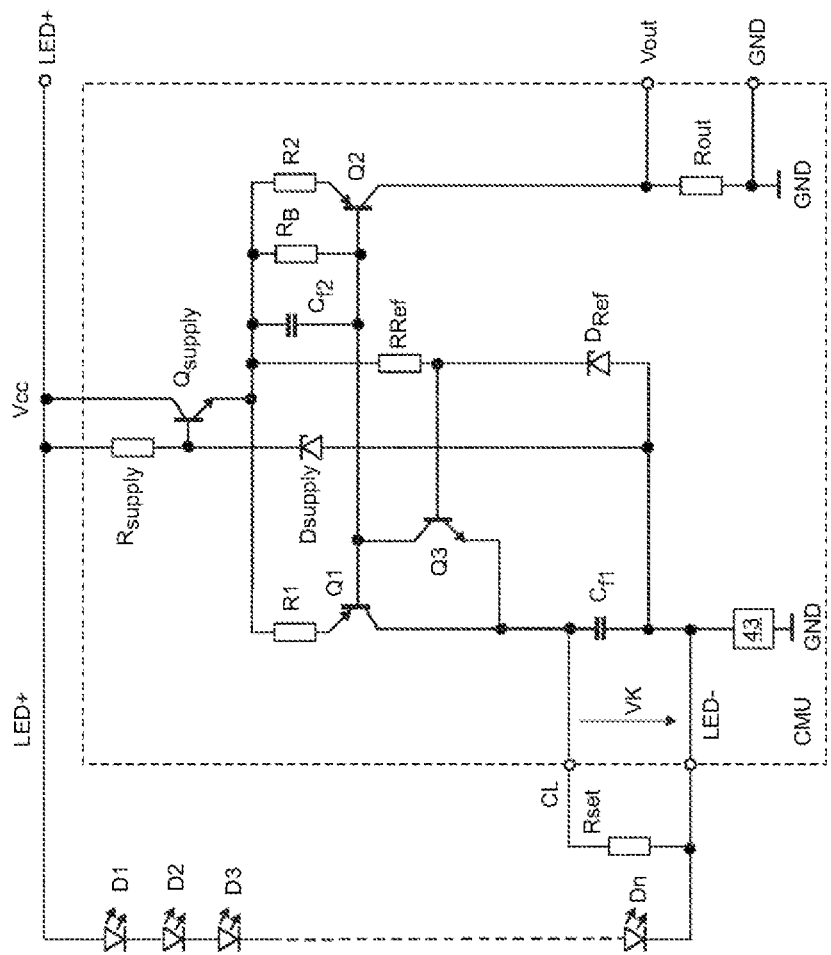

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1 shows the concept for the parallel circuit of the current-setting resistances, FIG. 2 shows a very simple solution for thermal derating, FIG. 3 shows the entire concept with the thermal derating unit TDU, FIGS. 4A and 4B show two simple embodiments for the TDU, FIG. 5 shows a simple embodiment of the interface on the power supply unit side, wherein Vout is a power supply unit-internal voltage which arises owing to the current in the communications line CL and is used as setpoint value for the control loop of the LED operating current provided by the power supply unit, FIG. 6 shows a family of characteristics for the circuit shown in FIG. 5, FIG. 7 shows a family of characteristics for the current-measuring device, FIG. 8 shows a block circuit diagram of a lighting system according to the present disclosure, FIG. 9 shows a flowchart as implemented by a microcontroller in the power supply unit, FIG. 10 shows an example of a configuration in terms of circuitry of the relevant function blocks denoted in FIG. 8, FIG. 11 shows a block circuit diagram of the digital embodiment of the lighting system according to the present disclosure including a simplified evaluation circuit, FIG. 12 shows a first embodiment of the simplified current-measuring device CMU, FIG. 13 shows a second embodiment of the simplified current-measuring device CMU, FIG. 14 shows a third embodiment of the simplified current-measuring device CMU, FIG. 15A shows a block circuit diagram of the digital embodiment of the lighting system according to the present disclosure including a simplified evaluation circuit, FIG. 15B shows a fourth embodiment of the simplified current-measuring device CMU, FIG. 16 shows a fifth embodiment of the simplified current-measuring device CMU, FIG. 17 shows a sixth embodiment of the simplified current-measuring device CMU, and FIG. 18 shows a seventh embodiment of the simplified current-measuring device CMU.

DETAILED DESCRIPTION

The following detailed description refers to the accompanying drawing that show, by way of illustration, specific details and embodiments in which the disclosure may be practiced.

A plurality of embodiments of the circuit arrangement are described below. The basic concept is always a three-line interface or an "analog single-wire interface", at which a light source module or a plurality of light source modules can be connected in parallel and connected to a single power supply unit, and the instantaneous requirements of each light source module are met in real time. The circuit arrangement according to the uses a setting resistance to define a current value. Various embodiments are described in respect of the measurement of said setting resistance. An analog embodiment of the interface is described below in FIGS. 1 to 7.

FIG. 1 shows the general concept of the setting resistances for the rated operating current values. Three light source modules LEM are shown, which are connected to a single power supply unit PSU. The connection includes three lines: a supply line LED+, a common grounding line LED− and a communications line CL. Each light source module contains at least one LED array. The LED array includes a multiplicity of LEDs. A multiplicity within the meaning of the invention means that at least three LEDs are connected in series. Each light source module or each LED array contains an individually assigned setting resistance Rset for defining the respectively applicable rated operating current value, the so-called current-setting resistance Rsetm. The current-setting resistance Rsetm or the current-setting resistances Rset1, Rset2, Rsetm couples or couple the common grounding line LED− to the communications line CL outside the power supply unit. This results in a parallel circuit including all of the current-setting resistances Rset1, Rset2, Rsetm provided in the system, with the result that the power supply unit PSU measures the equivalent resistance Rset of this parallel circuit. The concept states that the power supply unit PSU does not read a voltage, as in the prior art, but a current as representative of the conductance of this equivalent resistance. Then, an inverse law is applied to the value of the equivalent resistance in order to preset the value of the LED operating current provided by the power supply unit. The law is as follows:

$$Iout = Kv/Rset$$

Kv has the dimension of a voltage. Rset is the value which is formed by a current-setting resistance Rset1 or by the parallel circuit including a plurality of current-setting resistances Rset1, Rset2, Rsetm. As a result, the value of the operating current provided by the power supply unit is inversely proportional to the current-setting resistance Rset1 or to the equivalent resistance Rset of the at least one light source module, i.e. the lower the equivalent resistance is, the higher the output current of the power supply unit PSU is. The requirement for the value of the operating current to ultimately correspond to the sum of the rated current values of each individual light source module is met by the known Ohm's Law per se.

FIG. 2 shows a conceptual circuit diagram of an interface with the capability of thermal derating. Very simple thermal derating is added by placing a PTC element in series with Rset. As soon as the temperature of the light source module LEM increases, the resistance value of the PTC also increases and results in a lower rated current value for this module. The disadvantage of such an arrangement consists in that it is not suitable for a multiple connection of light source modules because the effect of a heated solitary PTC on the conductance of the parallel-connected current-setting resistances Rset would only take away the contribution of its associated heated module, which is insufficient for an effective reduction in the temperature of the light source module affected. The parallel-connected colder current-setting resistances therefore counteract the temperature-dependent increase in resistance of a single current-setting resistance. The dominance nature of the thermal derating is therefore not ensured. Nevertheless, such a solution could be used for very inexpensive applications when a partial current reduction is still acceptable in the case of a temperature rise, for example in the case of a few light source modules supplied by a power supply unit or in the case of good thermal coupling of the light source modules to one another. Furthermore, a single thermosensitive element in series with the current-setting resistance has the disadvantage of reducing its conductance and therefore the value for the current of the light source module continuously, quasi linearly or gradually, without a precise starting point for the thermal derating being defined, even when a few PTC elements demonstrate a very steep response around their rated trigger temperature. Therefore, the "nominal" current setting would be corrupted by a "parasitic" effect of the derating element.

FIG. 3 shows the concept of the three-line interface with a thermal derating unit TDU on the light source module. This concept is based on another approach, namely of providing a current source for the thermal derating unit TDU on the light source module. This current source is temperature-controlled by a thermosensitive element with appropriate circuitry, and the required auxiliary energy is supplied to said current source either directly from the supply line LED+ or from a center tap from the at least one LED array of the light source module in question, in order to avoid additional lines for the interface. The current source includes an amplifier and a temperature-sensitive resistance, through which an input current for the amplifier flows, which amplifier intensifies this input current to give the current ITDU of the current source. The current source has a response threshold which inhibits any generation of a current ITDU as long as a certain excess temperature of the light source module is not reached. As a result, an increase in the amplified current with the temperature (increase of ITDU) is steep enough for an entire system including a power supply unit and a plurality of thermally independent light source modules to be successful in limiting the maximum temperature of a single overheated light source module without in the process triggering instabilities owing to shifts in heat transfer times. The current source for the current ITDU is capable of completely overriding the signal formed by the equivalent resistance value Rset of all parallel-connected current-setting resistances: in such a way, it can safely protect the entire system and in particular the light source module on which it is integrated, even in the case of a light source module multiple connection with at the same time very concentrated overheating.

With the above-described temperature-dependent current source, there is a further problem. It is necessary to measure the resistance Rset of the module No.x independently of the actual temperature of the module x and therefore independently of the current provided by the current source. It needs to be established how the resistance Rset is measured in order to make it possible to predict the effect of the current source.

In the circuit arrangement according to the invention, a permanent voltage source Vk is used in order to measure the resistance value by virtue of the fact that the circuit arrangement applies the voltage of the voltage source across the current-setting resistance Rset (or the parallel circuit of a plurality of current-setting resistances Rset) and reads the current flow caused thereby. The voltage of the voltage source is therefore output at the terminal on the power supply unit side for the communications line CL. This in turn leads the thermal derating unit TDU into direct interaction with the current, which is defined by means of Vk/Rset, and solves the finally addressed problem of dominant thermal derating.

FIG. 4A illustrates a first embodiment of the light source module, which provides the interface with only one bipolar transistor, an NTC element and some added resistances. The circuit contains a voltage source V1, which is derived from the supply line LED+ of the light source module. LEDs have a relatively stable forward voltage, with the result that they can be used as sufficiently good voltage source replacement. Depending on the feed voltage required for the TDU, the voltage source V1, always related to the common grounding line LED−, can be connected to a tap between two sections of the plurality of series-connected LEDs. This means that the voltage V1 can be set in such a way that it corresponds to a multiple of the forward voltage of a single LED. A series circuit including the NTC and a threshold resistance Rthr is located in parallel with this voltage V1. The base of an NPN bipolar transistor (BJT) Q1 is connected to the node between the NTC and the Rthr. The collector of Q1 is connected to the voltage V1. The emitter of Q1 is coupled to the communications line CL via an emitter resistance Rtg. All of these component parts described up to this point in FIG. 4A form the thermal derating unit TDU. The at least one current-setting resistance Rset is connected between the communications line CL and the common grounding line LED−.

In this circuit, the emitter potential of Q1 is raised to a voltage (in this case Vk) which is preset by the power supply unit PSU, as a result of which the threshold is realized below which no current ITDU is injected into the communications line CL. If the temperature increases, the NTC begins to increase the base potential of Q1 until the NPN transistor Q1 has come into the active range. From now on, the emitter resistance Rtg defines the gain of the thermal derating unit TDU and therefore the increase in the injected current ITDU over the increase in temperature. Based on the voltages V1 and Vk, the resistance Rthr and the resistance value of the NTC at the temperature specified as trigger threshold for the TDU determine the onset point for the thermal derating. A further advantage of this arrangement is the good linearity of the current ITDU over the temperature which can be achieved.

One of the most interesting advantages of the invention, in addition to the simplicity of the implementation in respect of the light source module, is its suitability for use in systems with different levels of quality owing to the setting of the desired accuracies and features alone as a result of corresponding circuit complexity of the interface on the power supply unit side. In other words, it is possible to remove the read interface on the power supply unit side corresponding to the required accuracy and/or further necessary features.

FIG. 4B shows a complementary implementation as second embodiment of the interface on the side of the light source module LEM. In this case, a PNP bipolar transistor Q2 is used together with a PTC. A PTC is a temperature-sensitive resistance with a positive temperature coefficient. As in FIG. 4A, the voltage V1 is derived either from the total number of LEDs connected in series or from some of said LEDs. In contrast to the embodiment shown in FIG. 4A, the collector of Q2 forms the current source connection with the current ITDU, which is connected to CL. In this way, the thermal derating threshold is no longer dependent on Vk, but only on the voltage V1, which is easily reproducible, and on the values of the voltage divider formed by the temperature-sensitive resistance value of the PTC and the threshold resistance Rthr. As in FIG. 4A, the emitter resistance Rtg determines the gain of the thermal derating unit TDU.

No further figure is required to explain that when the order of the elements in the voltage divider which defines the onset threshold temperature is swapped over, in each case the bipolar transistor which is complementary in FIG. 4A or FIG. 4B is used. Of particular interest is the combination of the PNP transistor coupled to V1 in conjunction with an NTC, which is connected to the base of the transistor and the common grounding line LED−.

FIG. 5 shows an embodiment of the interface of the power supply unit PSU. This is a very simple circuit arrangement for relatively simple power supply units where a high degree of accuracy is not required. Owing to the requirement of as few connecting lines as possible and owing to the concept of a common grounding line LED−, there is the problem of the voltage drop on this common grounding line, caused by the operating current of the at least one light source module. The embodiment adopts a very simple circuit based on a single operational amplifier without any compensation of a voltage shift on the common grounding line owing to the light source module current. Said single operational amplifier OpAmp of the power supply unit interface is connected to the communications line CL at its negative input and is connected to the voltage Vk, already known, at its positive input, which voltage, owing to its direct reference to the common grounding line LED−, forms the reference for the interface circuit of the power supply unit PSU. The amplifier output is connected to the negative input via the current-measuring resistance Rfb, as a result of which the obligatory feedback of the operational amplifier is achieved. The behavior of the operational amplifier of wishing to match the potentials of its two inputs to one another first of all generates the reference voltage Vk on the communications line CL and secondly generates an internal measurement signal Vout, whose value corresponds to the voltage Vk, increased by the measurement current Ic1 multiplied by the current-measuring resistance Rfb. This measurement signal Vout is used to set the LED operating current Iout which is provided by the power section CG to the output of the power supply unit. The output of the power supply unit is connected to LED+ and LED−, i.e. to the supply lines of the at least one light source module.

The measurement error can be reduced to a value suitable for the respective application by selecting an adequate value for Vk. In an embodiment, the maximum measurement error on the grounding line is fixed at 50 mV. This corresponds to one ampere on a 50 mohm connection. This fixing of the measurement error results in 5 V as the minimum value for the voltage Vk in order that Vout has an error caused by the voltage drop of below 1%.

In order to achieve better accuracy, other compensation techniques in respect of the voltage drop on the common grounding line can be used. One technique consists in disconnecting the operating current for the at least one light source module prior to the measurement of Rset. This measurement can be performed when the entire system is switched on by a delay to enabling of the operating current.

It should be noted that, when disconnecting the array of light source modules by removing the power supply on the power supply line LED+, the present current level on the communications line CL is not influenced by the temperature signal. This is not a disadvantage because this information is not necessary if the light source modules are completely switched off, but rather it is one approach for reading the value of Rset not only with a higher degree of accuracy, but also without any deviation as a result of possible overheating. The reading therefore takes place without any deviation caused by the respective light source module temperature.

The temperature information alone is available, on the other hand, simply by disconnecting the comparison voltage Vk from the positive input of the operational amplifier OpAmp and by connecting this input to the common grounding line. As a result, the voltage on the communications line CL becomes approximately zero, and the current in CL is therefore independent of the value of Rset. Therefore, the current in CL is now only a function of the light source module temperature. In the case of multiple connections, i.e. a plurality of connected modules, the current is a function of the module with the highest temperature. This means that the power supply unit operating the light source modules is now capable of reducing the operating current to these modules from the beginning and determining the present operating temperature of the light source modules even when said power supply unit is not overheated. For a high level of measurement accuracy of the temperature, it is advantageous if Rset is known.

FIG. 6 shows a temperature-dependent family of characteristics of the power supply unit. The family of curves shows the internal control voltage Vout of the power supply unit over the temperature of the at least one light source module. The individual curves relate to the current requirement of the at least one light source module which is connected at that time. It can clearly be seen that the thermal derating begins at a temperature of approximately 93° C. until, at approximately 100° C. to 104° C., the supply of operating current is completely disconnected.

The function of the interface will be explained below with reference to a practical example. As can be seen from the figure, an internal measurement signal Vout of 10 V results in an output current of 1 A. The interface is intended to be configured in such a way that a conductance of 1 mS for Rset results in an output current of 1 A. As shown in FIG. 6, the voltage source Vk is set to 5 V. This means that 5 V are applied to Rset (see FIG. 5). The operational amplifier operates in such a way as to minimize the level difference at its two inputs, which is made possible by its feedback via Rfb. If, therefore, Vk corresponds to 5 V, this means that 5 V are also present at the negative input of the operational amplifier. This results in 5 V at the respective current-setting resistance Rset and in a current through the communications line CL of 5 V/1 kohm=5 mA. These 5 mA through the communications line CL likewise flow through the current-measuring resistance Rfb because the input of the operational amplifier has a high impedance and therefore a negligible current consumption. Owing to the fact that the voltage of the internal measurement signal Vout is intended to be 10 V, corresponding to FIG. 6, for the desired operating current, the voltage across the current-measuring resistance Rfb likewise needs to be 5 V, which results in a resistance value of 1 kohm, or 1 mS for Rfb. Corresponding to this example, a light source module with a current requirement of 2 A would have a current-setting resistance Rset with a value of 2 mS or 500 ohms.

As already mentioned, the three-line interface has the disadvantage that the measurement signal is falsified by the voltage drop on the common grounding line LED−, which voltage drop is caused by the operating current of the at least one light source module. The measurement current is passed through the common grounding line LED− together with the LED operating current.

FIG. 7 shows the characteristic of the current-measuring device CMU, which is primarily dependent on the current-measuring resistance Rfb. The characteristic shows the internal signal Vout of the output of the current-measuring unit CMU against the normalized current-measuring resistance Rfb/RsetMin. RsetMin is the minimum permissible value of the at least one current-setting resistance which results in the maximum specified output current IoutMax of the power supply unit PSU. Therefore, the power supply unit provides its maximum current in the case of the value 1 illustrated, when Rfb=RsetMin, i.e. also provides its maximum power at its output in the case of the given voltage of the at least one light source module. The internal measurement signal Vout belonging to the maximum power is 2*Vk, as described in the example for FIG. 6.

Using the following FIGS. 8 to 10, a digital embodiment of the invention will now be described. The following embodiments contain the expression "the light source modules LEM". This expression is intended to include at least one light source module LEM, but it is also possible for a plurality of light source modules LEM1 to LEMm to be meant. The expression includes all light source modules which are connected to the power supply unit PSU. Each light source module LEM1, LEM2 . . . LEMm has a current-setting resistance Rset1, Rset2 . . . Rsetm. The light source modules, connected in parallel, are connected to the power supply unit PSU. Therefore, the current-setting resistances Rset1, Rset2 . . . Rsetm are likewise connected in parallel, and there is a resultant current-setting resistance Rset. Current-setting resistance Rset therefore always denotes the resultant current-setting resistance Rset of all connected light source modules LEM in the text which follows.

FIG. 8 shows a block circuit diagram of the digital embodiment of the lighting system according to the invention. The resistance Rset1 is part of the light source module LEM, and the other circuit parts are located on the power supply unit PSU. The block circuit diagram therefore primarily relates to the relevant circuit sections in the power supply unit PSU which are capable of measuring the setting resistance Rset and converting the information into a current for the LEDs of the light source module LEM. The figure shows parts of the current-measuring unit CMU, which is responsible for detecting the impressed current and therefore the current-setting resistance Rset.

The current-setting resistance Rset is connected to an amplifier circuit 30, which impresses a voltage to the resistance and measures the current at the current-setting resistance Rset. The amplifier circuit outputs a voltage which is proportional to the conductance of the current-setting resistance Rset. This voltage is input into an offset matching circuit 33, which then inputs a matched voltage in turn into an amplitude matching circuit 35. Here, the voltage is now matched in terms of amplitude such that the downstream analog-to-digital converter 37, into which this voltage is then input, is controlled in optimum fashion. The analog-to-digital converter 37 is part of a microcontroller 39, which is to be assigned to the power supply unit PSU. The microcontroller then controls a power section CG, which in turn sets the corresponding current at the output of the power supply unit PSU.

This matching of the measured current to the current-setting resistance Rset1 is helpful for being able to implement the solution according to the invention as efficiently as possible. According to the invention, now not the entire value range of the analog-to-digital converter 37 is used for measuring the resistance, but only a subregion, whereas the boundary regions of the value range of the analog-to-digital converter 37 are used for detecting fault cases.

FIG. 9 shows a flowchart, as is implemented by a microcontroller 39 in the power supply unit PSU. At the beginning, i.e. when the power supply unit PSU is switched on or a mains voltage is supplied to said power supply unit, the power section CG in the power supply unit PSU is disconnected. The power section CG is responsible for supplying power to the light source modules LEM connected to the power supply unit PSU. The value range of this exemplary sequence is designed for an analog-to-digital converter with 8 bit resolution. 8 bit resolution means that the analog-to-digital converter can represent its voltage range using 256 values. The control range of the analog-to-digital converter therefore corresponds to the value 256. Naturally, analog-to-digital converters with different resolutions can likewise be used without departing from the teaching according to the invention. For example, microcontrollers with analog-to-digital converters with a resolution of 10 bits are widespread on the market. These analog-to-digital converters can then generate values of between 0 and 1023, for example. The control range of the analog-to-digital converter therefore corresponds to the value 1024. The analog-to-digital converter 37 in the present embodiment therefore outputs a value of between 0 and 255 with a measurement, which value correlates with the input voltage. The sequence begins with the measurement of the voltage input into the analog-to-digital converter 37. The analog-to-digital converter provides a value of between 0 and 255 in return, as just described.

This value is now called up in a plurality of steps and assigned to a range. In the present embodiment, five different ranges are provided which can all be assigned to a specific function or fault case. Owing to the value measured by the analog-to-digital converter 37, the power supply unit PSU assumes either a function state or a fault state. The function state is characterized by the fact that the power section CG of the power supply unit PSU is switched on and current is being supplied to the connected light source modules LEM. The fault state is characterized by the fact that the power section CG of the power supply unit PSU is switched off or remains switched off and there is no current being supplied to the connected light source modules LEM.

In the present embodiment, the range of 0 to 23 should be assigned to the fault case of faulty wiring since the current-setting resistance Rset is too high or is not present. The power section CG of the power supply unit PSU remains disconnected, and operating current is not supplied to the light source modules.

The range of 24 to 86 is assigned to the fault case of an LED current which is too low, which can occur when light source modules LEM which are unsuitable for the power supply unit PSU are connected which require an excessively low operating current which the power supply unit PSU cannot provide. The power section CG of the power supply unit PSU remains disconnected, and operating current is not supplied to the light source modules.

The range 86 to 239 is assigned to the function case of rated operation. This is the only case in which the power section CG of the power supply unit PSU is switched on and the required operating current is being supplied to the light source modules.

The range 240 to 249 is assigned to the fault case of an excessively high LED current which can occur when light source modules LEM which are unsuitable for the power supply unit PSU or too many light source modules LEM are connected, which require an excessively high operating current which the power supply unit PSU can no longer provide. The power section CG of the power supply unit PSU remains disconnected, and no operating current is supplied to the light source modules.

The range 250 to 255 is assigned to the fault case of a short circuit. The current-setting resistance Rset is very low or close to 0 ohm. This can occur owing to a defective module or owing to faulty wiring. The power section CG of the power supply unit PSU remains disconnected, and no operating current is supplied to the light source modules.

After a cycle time of 100 μs to 500 μs, a new measurement is initiated. The connected light source modules LEM are therefore continuously monitored for faults. As soon as a fault occurs, the power section CG in the power supply unit PSU is disconnected in order to protect the light source modules LEM and the power supply unit PSU.

If the current level required by the light source modules LEM can be provided by the power supply unit PSU, said current level is provided by the power section CG of the power supply unit PSU and applied to the light source modules LEM.

FIG. 10 shows an example of a configuration in terms of circuitry of the relevant function blocks denoted in FIG. 8.

In this case, too, the principle in accordance with the invention whereby a voltage is applied to the communications line CL and the current is measured in this line applies. The current flowing through the communications line CL in the present exemplary embodiment results in setting of an LED current Iout:Iout=1000 $I_{CL}$.

In this embodiment, any power supply unit has a nominal control range Ioutmin–Ioutmax, which similarly corresponds to a range Rsetmax–Rsetmin of the current-setting resistance Rset.

The left-hand amplifier stage with the operational amplifier IC1a generates the voltage V1, which is indirectly proportional to the current-setting resistance Rset or directly proportional to the current on the communications line $I_{CL}$.

The reference voltage Vref generated by a reference diode D2 is 5.00 V and is present at the current-setting resistance Rset. Therefore, the following relationship applies:

$$I_{CL}=5\ V/Rset \quad [1]$$

$$Iout=5000\ V/Rset \quad [2]$$

The resistance R1 is dimensioned such that the maximum voltage V1max occurring at V1 satisfies the following relationship in the case of the lowest possible current-setting resistance Rsetmin: V1max<Vcc−1.5 V. The diode D1 is a suppressor diode, which protects the input of the communications line CL from faulty wiring and ESD. This needs to be selected, inter alia, in accordance with low leakage currents in order that it does not falsify the light-emitting diode current Iout. The resistances RA1 and RB1 are used for setting Vref. The RC elements R11, R12, C1, R2, R3, C3 and R4, R5, C5 around the amplifiers are used for low-pass filtering. The input variable of the communications line CL is Rset, i.e. is not a dynamic variable. Therefore, undesired higher-frequency interference can be alleviated by filters. The capacitors in the feedback path of the operational amplifiers IC1a and IC1b are used for stabilization. The output voltage V1 of the left-hand amplifier stage is now input into the right-hand amplifier stage. The right-hand amplifier stage with the operational amplifier IC1b is used for compensating for the voltage Vsh across the shunt resistance Rshunt. The following relationship applies:

$$V2=V1*R3/(R2+R3)*(1+R6/(R4+R5)-Vsh*R6/(R4+R5)) \quad [4]$$

When $R3=R4$ and $R4+R5=R6$, this gives:

$$V2=V1-Vsh=Vref(1+R1/Rset)=Vref+R1I_{CL} \quad [5]$$

In this way, the dynamic influence of the shunt resistance Rshunt, through which the operating current of the light-emitting diodes Iout is flowing, is compensated for within wide frequency ranges. The voltage V2 now also needs to be matched to the control range of the analog-to-digital converter 37.

The signal is shifted downwards with the aid of a reference diode by a predetermined offset voltage FV and then reduced by a moderate divider.

This corresponds to matching of position and amplitude of the Rset range to the control range of the analog-to-digital converter. This measure ensures that the control range of the analog-to-digital converter is used effectively, and the following results:

$$V_{ADC}=(V2-FV)*R8/(R7+R8) \quad [6]$$

The resistances RA2 and RB2 are used for setting the offset voltage FV.

If [5] is now incorporated in [6], the following relationship results:

$$V_{ADC}=R8/(R7+R8)*(V_{ref}+R1*I_{CL}-FV) \quad [7]$$

$$Iout=1000I_{CL}=1000/R1[(1+R7/R8)V_{ADC}-Vref+FV] \quad [8]$$

$$Iout=\alpha V_{ADC}+\beta \quad [9]$$

One of the value of the reference voltage of the analog-to-digital converter and the bit resolution of the analog-to-digital converter (8 or 10 bits) is also incorporated in the constant α.

The function states and the fault states are now mapped as follows in the present embodiment:

The range Rsetmin–Rsetmax is mapped, for example, onto 60% of the control range of the analog-to-digital converter. Then in each case 20% still remain at the upper and lower ends of the control range for detection of fault states and further function states:

a.) The current-setting resistance Rset is lower than corresponds to the maximum output current Ioutmax in the power supply unit. This range can be used, for example, to switch over the current regulation to an external input and to set the current by means of the DALI protocol, for example.

b.) The current-setting resistance Rset is even lower up to the short circuit. This indicates faulty wiring and, correspondingly, the power supply unit PSU is brought into a fault state.

c.) The current-setting resistance Rset is greater than that which corresponds to the minimum output current Ioutmin. This range can also be used, for example, to switch over the current regulation to an external input and to set the current by means of the DALI protocol, for example.

d.) The current-setting resistance Rset is even higher up to the point where the terminals are open. This likewise indicates faulty wiring or defective light source modules and, correspondingly, the power supply unit PSU is brought into a fault state. The limits between cases a and b or between c and d are selected purely by way of example here and can in principle be selected as desired. In the case of all limits, hystereses are provided in order to avoid oscillation between the modes. Case d also includes identification of overvoltage on the communications line CL (as a result of faulty wiring).

FIG. 11 shows a block circuit diagram of embodiments of the lighting system according to the invention with a simplified evaluation circuit. The simplified evaluation circuit is based on the knowledge that electrical isolation or a potential shift is required for suitable evaluation of the current-setting resistance Rset since a current-measuring element 43 is provided in the circuit for the LEDs, with the result that the measurement signal does not have a direct reference to ground to the circuit ground GND. Since most evaluation variants, whether they be digital evaluations by microcontrollers or analog circuits, presuppose a reference to ground of the signal, however, an evaluation circuit is required which makes available the measurement signal, in relation to ground GND. The ground GND is in this case the internal circuit ground of the power supply unit PSU. A connection of the current-measuring element 43 is connected to ground GND. The other connection of the current-measuring element 43 is connected to the negative output LED−, also referred to as common grounding line above. Therefore, it is necessary to differentiate between the common grounding line LED− and the internal circuit ground GND. The potential thereof is similar, but not identical. The measurement signal therefore needs to be shifted in terms of its voltage by the potential difference between the common grounding line LED− and the internal circuit ground GND. This takes place using a current mirror, which measures the current on the communications line CL. This current is converted into a voltage GND referenced to the internal circuit ground on the other side of the current mirror by means of a resistance. This can then be evaluated in a suitable manner by a control circuit 49, for example.

FIG. 12 shows a first embodiment of the simplified current-measuring device CMU. The core of the simplified current-measuring device CMU is a simple current mirror, but which has been extended such that it applies the predetermined voltage Vk to the communications line CL. The current then flowing through the current-setting resistance Rset is mirrored and can then be converted into the internal measurement signal Vout by the measuring resistance $R_{out}$. This internal measurement signal Vout is related to the internal circuit ground GND. The current mirror has an input-side first transistor Q1 and an output-side second transistor Q2. The input-side first transistor Q1 is now actuated in such a way that the predetermined voltage Vk is present at the communications line CL. This can be achieved by various circuit measures.

In the first embodiment of the simplified current-measuring device CMU, the voltage at the communications line CL is adjusted to the predetermined value by a circuit including a Zener diode $D_{Ref}$ and a third transistor Q3 in a basic circuit. The collector of the third transistor Q3 is connected to the base of the first transistor Q1. The emitter of the third transistor Q3 is connected to the collector of the first transistor Q1. This point is also the input of the communications line CL. The cathode of the Zener diode $D_{Ref}$ is connected to the base of the third transistor Q3. The anode of the Zener diode $D_{Ref}$ is connected to the common grounding line LED−. A resistance $R_{Ref}$ is connected between the base of the third transistor Q3 and a supply voltage Vcc. The current mirror is connected to the supply voltage Vcc via emitter negative-feedback resistances R1 and R2. The transistors Q1 and Q2 are PNP transistors, the transistor Q3 is an NPN transistor. Optionally, a filter capacitor $C_{f1}$ can also be connected between the emitter of the third transistor Q3 and the common grounding line.

The function of the circuit arrangement will now be explained below:

If the voltage on the communications line CL is too high, the base current of the third transistor Q3 is reduced. Therefore, the collector current of the third transistor Q3 is also reduced, in order that the base-emitter voltage of the first transistor Q1 decreases. Therefore, the collector current of the first transistor Q1, which corresponds to the current on the communications line CL, also decreases. The voltage which forms as a voltage drop across the current-setting resistance Rset is therefore likewise reduced. By virtue of this chain of action, the voltage on the communications line CL is kept at the predetermined value, and the current flowing through the communications line CL is measured and mirrored at the current mirror. There, it is converted back into an internal measurement signal $V_{out}$, which is a measure of the conductance of the current-setting resistance Rset. The circuit provides, to a large degree, supply voltage independence and good suppression of supply voltage fluctuations.

In the case of a predetermined voltage Vk of 5 V on the communications line CL and an emitter negative-feedback voltage of approximately 1 V to 5 V, the following applies with sufficient accuracy:

$$U(R1)=R1*I(R1)=R1*I_{CL} \quad [10]$$

$$U(R2)=U(R1)$$

$$I(R2)=R1*I_{CL}/R2 \quad [12]$$

$$I(R2)=I(R_{out}) \quad [13]$$

$$Vout=I_{CL}*R_{out}*R1/R2 \quad [14]$$

When Vk=5 V, the following therefore applies:

$$Vout=(5\ V/Rset)*R_{out}*R1/R2 \quad [15]$$

The internal measurement signal $V_{out}$ is therefore only now dependent on known values and the measurable current $I_{CL}$ on the communications line CL and is therefore simple to evaluate.

It is advantageous to use the transistors Q1 and Q2 as paired double transistors in a common housing since this increases the accuracy of the circuit. Depending on the requirements in respect of accuracy, however, this is not necessary and is therefore optional.

If a greater potential shift of the internal measurement signal $V_{out}$ is required, this can be achieved by suitably selecting the emitter negative-feedback resistances R1 and R2. A further resistance can be introduced into the path from collector Q2 to Rout in addition to or instead of the value selection for R1 and R2 in order to be able to set the voltage drop across the collector-emitter path of Q2 to a desired value.

The first embodiment of the simplified current-measuring device CMU provides the advantage that it has a minimum temperature coefficient of +2 mV/K since the Zener diode used from 5.6 V has a very low temperature coefficient. Since the third transistor Q3 also has approximately a T, of 2 mV/K, the temperature dependence of the arrangement is approximately 4 mV/K. In the case of a temperature difference of ±50 K, this would correspond to a change in the predetermined voltage on the communications line CL of ±2%. Therefore, a light source module LEM can be monitored precisely for approximately ±1 K. The voltage Vcc required for supplying power to the circuit is approximately 12 V, in comparison with the common ground LED−, and is therefore easy to provide. The capacitors $C_{f1}$ and $C_{f2}$ are used for filtering and stabilizing the circuit and are not absolutely necessary. The resistance $R_B$ is a pull-down resistance for the current mirror and is likewise not absolutely necessary. However, it can contribute to the ability to operate the current mirror more stably since it forms an opposite pole for controlling the current mirror by the third transistor Q3.

FIG. 13 shows a second embodiment of the simplified current-measuring device CMU. The second embodiment of the simplified current-measuring device CMU is similar to the first embodiment of the simplified current-measuring device CMU, and therefore only the differences with respect to the first embodiment are explained.

In the second embodiment, the voltage on the communications line CL can be set more precisely. As in the first embodiment, a series circuit including the reference diode $D_{Ref}$ and a resistance $R_{Ref}$ is connected between the supply voltage VCC and the common ground LED−. However, the node between the reference diode $D_{Ref}$ and a resistance $R_{Ref}$ is not connected directly to the base of the third transistor Q3 as in the first embodiment, but via a voltage divider including two resistances $R_{Ref1}$ and $R_{Ref2}$, which is connected between the node between the reference diode $D_{Ref}$ and a resistance $R_{Ref}$ and the common grounding line LED−. The base of the third transistor Q3 is connected to the center point of the voltage divider.

In order to improve temperature compensation, another double diode can be introduced between the resistance $R_{Ref2}$ and the common grounding line LED−.

FIG. 14 shows a third embodiment of the simplified current-measuring device CMU. The third embodiment of the simplified current-measuring device CMU is similar to the first embodiment of the simplified current-measuring device CMU, and therefore only the differences with respect to the first embodiment are explained.

In the third embodiment of the current-measuring device CMU, the Zener diode is replaced by an adjustable Zener diode. The adjustable Zener diode can be, for example, an adjustable Zener diode of the type TL431. The adjustable Zener diode $D_{Ref}$ is connected in the same way as the Zener diode in the first embodiment. The control electrode of the adjustable Zener diode $D_{Ref}$ is connected to the center point of a voltage divider including two resistances $R_{Ref1}$ and $R_{Ref2}$. The voltage divider including the two resistances $R_{Ref1}$ and $R_{Ref2}$ is connected between the communications line CL and the common ground LED−. This circuit variant provides maximum accuracy when setting the predetermined voltage Vk on the communications line CL by means of the voltage reference which can be set.

FIG. 15A shows a block circuit diagram of the digital embodiment of the lighting system according to the invention with a simplified evaluation circuit. FIG. 15B shows a fourth embodiment of the simplified current-measuring device CMU. The fourth embodiment of the simplified current-measuring device CMU is similar to the first embodiment of the simplified current-measuring device CMU, and therefore only the differences with respect to the first embodiment are explained.

In the fourth embodiment, the base voltage of the current mirror is regulated by means of a microcontroller 39. The microcontroller 39 is programmed in such a way that it adjusts the voltage Vk on the communications line CL to the predetermined value, for example 5V. For this purpose, the current-measuring device CMU has two further outputs CL, LED− and an input PWM. The potential of the common ground LED− and the potential of the communications line CL are present at the two further outputs. Therefore, the microcontroller 39 is capable of measuring the voltage on the communications line CL with respect to its reference potential GND by virtue of it measuring the potential on the communications line CL using a first analog-to-digital converter 37a, and measuring the potential of the common grounding line LED− by a second analog-to-digital converter 37b. The two potentials can now be subtracted digitally from one another so that the voltage on the communications line CL with respect to its reference potential LED− is known. The internal measurement voltage Vout is measured by means of a third analog-to-digital converter 37c. The microcontroller then applies a pulse-width-modulated signal PWM to the input PWM. The input PWM is connected to the gate of a MOSFET $Q_{PWN}$. The drain connection of the MOSFET $Q_{PWN}$ is connected to the base of the first transistor Q1 via a resistance $R_{PWN}$. The source connection of the MOSFET $Q_{PWM}$ is connected to the internal circuit ground GND. The microcontroller 39 applies a pulse-width-modulated signal to the input PWM, which pulse-width-modulated signal is regulated by means of the microcontroller 39 in such a way that the voltage on the communications line CL corresponds to the predetermined voltage. In this case, the voltage can be set by changing the duty factor at the input PWM. By virtue of corresponding programming, the temperature dependence of the current-measuring device CMU can be corrected almost completely. This can be achieved, for example, by stored tables in the microcontroller 39, which change the duty factor at the input PWM depending on the temperature.

In the case of digital actuation by means of a microcontroller 39, the current-measuring device CMU can also be operated in clocked fashion. Since the thermal inertia of the light source modules LEM is high, the measurement of the resultant current-setting resistance Rset can take place in relatively large time intervals; during the remaining time, the current-measuring device CMU is then inactive. As a result, the transistors Q1 and Q2 of the current mirror are not heated unnecessarily and the temperature dependence of the arrangement is reduced. For example, the current-measuring device CMU can always be activated for a few ms for determining the current requirement of the connected light source modules LEM in order then to be deactivated for one or more seconds. This gives the transistors Q1, Q2 sufficient time to cool down again and therefore results in a considerable reduction in the average current loading of these transistors.

FIG. 16 shows a fifth embodiment of the simplified current-measuring device CMU. The fifth embodiment of the simplified current-measuring device CMU is similar to the fourth embodiment of the simplified current-measuring device CMU, and therefore only the differences with respect to the fourth embodiment are explained.

In contrast to the fourth embodiment, in the fifth embodiment the voltage supply VCC for the current-measuring device CMU is provided via the operating voltage of the supply line LED+ of the light source modules LEM. For supplying power to the circuit, it is necessary to ensure that the operating voltage of the supply line LED+ is at least 12 V above the common grounding line LED−.

FIG. 17 shows a sixth embodiment of the simplified current-measuring device CMU. The sixth embodiment of the simplified current-measuring device CMU is similar to the fifth embodiment of the simplified current-measuring device CMU, and therefore only the differences with respect to the fifth embodiment are explained.

In the sixth embodiment, too, an operating voltage VCC for the current-measuring device CMU is fed from the supply line LED+. The voltage tapped off from the supply line is still filtered of the components $R_{supply}$ and $C_{supply}$, however. As a result, the influence of possible clocked operation of the current-measuring device CMU on the light emission of the light source modules LEM is reduced at low dimming settings.

FIG. 18 shows a seventh embodiment of the simplified current-measuring device CMU. The seventh embodiment of the simplified current-measuring device CMU is similar to the first embodiment of the simplified current-measuring device CMU, and therefore only the differences with respect to the first embodiment are explained. In this embodiment, too, the current-measuring device CMU is fed from the supply line LED+. The feed circuit has additionally a voltage-stabilizing function, however, with the result that the supply voltage for the current-measuring device CMU remains the same independently of the voltage on the supply line LED+.

Therefore, the power losses at the first and second transistors Q1 and Q2 are limited to a constant value, which results in an increase in the accuracy of the current-measuring device CMU.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SYMBOLS

Power supply unit PSU
Communications line CL
Light source module LEM
Current-setting resistance Rset
Power section CG
Current-measuring device CMU
Amplifier 30
Offset matching circuit 33
Amplitude matching circuit 35
Analog-to-digital converter 37
Microcontroller 39
Thermal derating unit TDU
Internal measurement signal Vout

The invention claimed is:

1. A power supply unit, comprising:
an output for outputting an operating current in response to an internal measurement signal,
a communications line, and
a current-measuring device connected to the communications line,
wherein
the current-measuring device generates a current on the communications line proportional to the conductance of a current-setting resistor,
the current-measuring device has a current mirror for mirroring the generated current on the communications line, the current-measuring device converts the mirrored current into the internal measurement signal with a reference potential different than a reference potential of the communications line, and
at least one light source module for connecting to the output, wherein the at least one light source module has the current-setting resistor for connecting to the communications line.

2. The power supply unit as claimed in claim 1, wherein the current mirror is formed by a first transistor and a second transistor, wherein the first and second transistors have first and second emitter negative-feedback resistors, respectively.

3. The power supply unit as claimed in claim 2, wherein control electrodes of the first transistor and of the second transistor are connected to one another, a reference electrode of the first transistor is connected to a supply voltage via the first emitter negative-feedback resistor, a reference electrode of the second transistor is connected to the supply voltage via the second emitter negative-feedback resistor, a working electrode of the first transistor is connected to the communications line, and a working electrode of the second transistor is connected to a measuring resistor.

4. The power supply unit as claimed in claim 2, wherein the power supply unit sets a voltage at a control electrode of the first transistor of the current mirror so that that a voltage on the communications line corresponds to a predetermined voltage.

5. The power supply unit as claimed in claim 2, wherein the current-measuring device has a third transistor, a working electrode of the third transistor is connected to the control electrode of the first transistor, a reference electrode of the third transistor is connected to the working electrode of the first transistor, and a control electrode of the third transistor is connected to a center point of a series circuit comprising a resistor and a Zener diode, wherein the series circuit is connected between the supply voltage and an output connection.

6. The power supply unit as claimed in claim 5, wherein the control electrode of the third transistor is connected to a center point of a voltage divider, the voltage divider is connected in parallel with the Zener diode.

7. The power supply unit as claimed in claim 5, wherein the Zener diode is an adjustable Zener diode, a control electrode of the adjustable Zener diode is connected to a center point of a voltage divider, the voltage divider is connected between the communications line and the output of the power supply unit.

8. The power supply unit as claimed in claim 2, wherein the current-measuring device has a third transistor, a working electrode of the third transistor is connected to the control electrode of the first transistor via a resistor, a reference electrode of the third transistor is connected to an internal circuit ground, and a control electrode of the third transistor is connected to a microcontroller.

9. The power supply unit as claimed in claim 8, wherein the current-measuring device generates the supply voltage of the current-measuring device from the output voltage of the power supply unit.

10. The power supply unit as claimed in claim 9, wherein the current-measuring device filters the supply voltage generated from the output voltage and/or stabilizes the supply voltage.

11. The power supply unit as claimed in claim 1, further comprising a plurality of light source modules, connected in parallel, for connecting to the power supply unit.

12. A light source module for connecting to a power supply unit, the power supply unit, comprising:
an output for outputting an operating current in response to an internal measurement signal,
a communications line, and
a current-measuring device connected to the communications line,
wherein
the current-measuring device generates a current on the communications line proportional to the conductance of a current-setting resistor,
the current-measuring device has a current mirror for mirroring the generated current on the communications line,
the current-measuring device converts the mirrored current into the internal measurement signal with a reference potential different than a reference potential of the communications line, and
at least one light source module for connecting to the output, wherein the at least one light source module includes the current-setting resistor for connecting to the communications line,
wherein the light source module has an input, a communications line, and the current-setting resistor for setting the current applied to the light source module.

13. The light source module as claimed in claim 12, wherein the light source module further comprises a thermal derating unit.

14. A method for setting a current value for at least one light source module connected to a power supply unit, the method comprising:
- applying a measurement voltage to a communications line by means of a current mirror,
- mirroring a current flowing in the communications line,
- converting the mirrored current into an internal measurement signal with a reference potential different than a reference potential of the communications line,
- evaluating the internal measurement signal, and
- setting an operating current at an output of the power supply unit in response to the evaluated measurement signal.

15. The method as claimed in claim 14, wherein the current flowing in the communications line is proportional to the conductance of a current-setting resistor included in the light source module.

* * * * *

UNITED STATES PATENT AND TRADEMARK OFFICE
CERTIFICATE OF CORRECTION

PATENT NO. : 9,554,430 B2
APPLICATION NO. : 14/410581
DATED : January 24, 2017
INVENTOR(S) : Walter Limmer et al.

It is certified that error appears in the above-identified patent and that said Letters Patent is hereby corrected as shown below:

In the Specification

Column 11, Line 19: Please delete "Ic1" between the words "current" and "multiplied", and write "$I_{CL}$" in place thereof Column 15, Line 25/26: Please add "V1 = Vref(1 + R1/Rset) + Vsh = Vref + R1 ICL + Vsh     [3]"

Column 18, Line 5: Please add "[11]" at the very end of the line

Signed and Sealed this
Sixth Day of June, 2017

Michelle K. Lee
*Director of the United States Patent and Trademark Office*